US006998439B2

(12) United States Patent
Shikano et al.

(10) Patent No.: US 6,998,439 B2
(45) Date of Patent: Feb. 14, 2006

(54) RESIN COMPOSITION, SHEET OBTAINED THEREFROM, PROCESS FOR PRODUCING SHEET, AND FORMED OBJECT

(75) Inventors: Miki Shikano, Tokyo (JP); Akifumi Kuwabara, Tokyo (JP); Toshinori Machida, Tokyo (JP)

(73) Assignee: Toyo Ink Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/470,401

(22) PCT Filed: Jan. 22, 2002

(86) PCT No.: PCT/JP02/00420

§ 371 (c)(1),
(2), (4) Date: Nov. 21, 2003

(87) PCT Pub. No.: WO02/057332

PCT Pub. Date: Jul. 25, 2002

(65) Prior Publication Data

US 2004/0076787 A1 Apr. 22, 2004

(30) Foreign Application Priority Data

Jan. 22, 2001 (JP) ............................ 2001-013279
Apr. 2, 2001 (JP) ............................ 2001-103424
Sep. 28, 2001 (JP) ............................ 2001-300190

(51) Int. Cl.
*C08L 75/00* (2006.01)
*C08G 18/42* (2006.01)
*C08J 7/04* (2006.01)

(52) U.S. Cl. .......................... 525/66; 525/64; 525/123; 525/448; 525/451

(58) Field of Classification Search .................. 525/64, 525/66, 451, 448, 123
See application file for complete search history.

(56) References Cited

U.S. PATENT DOCUMENTS

| | | | |
|---|---|---|---|
| 3,966,521 A | 6/1976 | Patton, Jr. et al. | |
| 4,049,636 A * | 9/1977 | Mao et al. | 528/75 |
| 4,160,798 A * | 7/1979 | Price et al. | 264/213 |
| 4,202,950 A * | 5/1980 | Statton | 525/123 |
| 4,261,877 A * | 4/1981 | Vogt et al. | 524/444 |
| 4,690,956 A | 9/1987 | Ramlow et al. | |

FOREIGN PATENT DOCUMENTS

| | | |
|---|---|---|
| JP | 56-14519 | 2/1981 |
| JP | 57-90011 | 6/1982 |
| JP | 60-20923 | 2/1985 |
| JP | 7-118597 | 5/1995 |
| JP | 2000-34440 | 2/2000 |
| JP | 2001-213932 | 8/2001 |

* cited by examiner

*Primary Examiner*—James J. Seidleck
*Assistant Examiner*—Irina S. Zemel
(74) *Attorney, Agent, or Firm*—Knobbe, Martens, Olson & Bear, LLP

(57) ABSTRACT

The present invention provides a resin composition comprising a vinyl polymer (A) having, at a side chain thereof, at least one structure selected from polyether, polyester, polycarbonate or polybutadiene which has a functional group that can react with an isocyanate group, and a polyisocyanate compound (B) having at least two isocyanate groups; a sheet made of a hardened body of the resin composition; a shaped body formed by shaping the sheet; and a sheet producing process comprising the steps of applying the resin composition and then hardening the resultant layer.

14 Claims, No Drawings

RESIN COMPOSITION, SHEET OBTAINED THEREFROM, PROCESS FOR PRODUCING SHEET, AND FORMED OBJECT

TECHNICAL FIELD

The present invention relates to: a resin composition which is suitable to form a sheet that is tough even if the sheet is used in a monolayer form, that has extensibility and flexibility, and that is superior in shaping-working properties, weather resistance and chemical resistance, and which is also superior in pigment dispersibility; a sheet that is tough even if the sheet is in a monolayer form and has extensibility and flexibility, that is superior in shaping-working properties, weather resistance and chemical resistance, and that can be used for various decorations, displays and packages; a process for producing the sheet; and a shaped body.

BACKGROUND ART

At present, shaped bodies of various plastic sheets are used as parts of automobiles, bicycles, motorboats, snowmobiles, domestic electric appliances, electronic devices, and so on. Plastic sheets are also used when coloring, decoration or display is applied to outer casing, interior materials, building materials, various guide plates, traffic signs, indoor/outdoor advertisements, signboards, shutters, windows, and so on or when various surface functions such as weather resistance, stain-proofing property and various kinds of resistances are given thereto. Moreover, various plastic sheets are used as a packaging material for preventing deterioration in quality of various articles or for protecting various functions of various articles.

In many cases, a semihard or soft vinyl chloride resin is used as a material for these plastic sheets. However, in order to give physical properties such as shaping-working properties, extensibility and flexibility to the semihard or soft vinyl resin, a large amount of a low molecular weight compound, such as a phthalic acid plasticizer, is added to the resin. Since the plasticizer has large migrating property, the resin has the following problems: the plasticizer migrates to the surface of a resin product with the passage of time, and damages the external appearance of the product; the plasticizer migrates to a product covered with the sheet and lowers the adhesive force between the product and the sheet; and swelling or creases are generated by expansion of a substrate. Since the plasticizer migrates to the surface of the resin product or the product covered with the sheet, the vinyl chloride resin also has a problem that the extensibility of the resin is lost, so that the state of the resin at the time of shaping processing cannot be kept. Furthermore, the soft vinyl chloride also has a problem that the resin has low hardness and poor abrasion resistance and scratch resistance.

In addition, acrylic resins such as polymethyl methacrylate, polyethylene terephthalate, polyethylene, polypropylene, and the like are generally known as materials for plastic sheets. However, acrylic resins such as polymethyl methacrylate, and polyethylene terephthalate have toughness but have poor extensibility. Therefore, in the case of the sheets made of these resins, the sheets are not easily shaped, in particular, at ordinary temperature. Thus, in order to make the sheets soft, a low molecular weight plasticizer must be added thereto in the same manner, as for vinyl chloride resin. Acrylic resins such as polymethyl methacrylate, polyethylene terephthalate, polyethylene and polypropylene have problems that, when the resins have a high molecular weight, the resins have low capability of dispersing a colorant such as a pigment therein and the resins are not easily colored, so that a decoration-receiving property of the resins markedly lowers. The resins have a problem in that, when the resins have a low molecular weight, the toughness of the sheets made of such a resin is poor.

In addition, as a material for plastic sheets having extensibility, urethane resin and the like are known. However, this has problems of poor toughness, low weather resistance, and the like.

In order to obtain a plastic colored sheet having toughness, extensibility and flexibility, a method of laminating at least two kinds of sheets, which have different physical properties that complement each other, is often used.

Resin compositions having good pigment-dispersibility so as to be easily colored, which have been used in colored layers hitherto, have a low molecular weight in many cases. Thus, if the compositions are used in a monolayer form, the layer has poor toughness. Therefore, it is difficult to use the compositions in the form of the monolayer sheet.

On the other hand, in the case of resins having both toughness and flexibility, such as soft polyolefin or the like, it is difficult to disperse a pigment therein. Thus, the resins are not easily colored and it is substantially impossible to produce colored sheets having various colors and made of such a resin.

For this reason, a method of laminating a colored resin layer having insufficient toughness but having good pigment-dispersibility on a sheet substrate made of a tough, flexible and transparent plastic sheet such as soft polyolefin to produce a tough and flexible colored sheet is used. However, in the case where this method is adopted, the following problems arise: a drop in the adhesion between the substrate layer and the colored layer, in particular, a drop in the adhesion at the time of shaping or extending; shrinkage, warp or peeling at the time of application or lamination or over time, which is due to difference between the thermal shrinkage ratios of the respective layers; and the like. Additionally, costs rise up since the laminating step is also needed.

Soft or semihard vinyl chloride resin has both pigment-dispersibility and toughness, and can be used in a monolayer sheet form. However, the pigment is dispersed in a plasticizer. Therefore, the plasticizer is an essential component and thus it is impossible to avoid various problems which result from use of the plasticizer, as described above.

DISCLOSURE OF THE INVENTION

Objects of the present invention are to provide a resin composition which is suitable to shape a sheet that is tough even if the sheet is used in a monolayer form, that has extensibility and flexibility, and that has superior shaping-working properties, weather resistance and chemical resistance, and which also has superior pigment dispersibility; a sheet that is tough even if the sheet is in a monolayer form and has extensibility and flexibility, that has superior shaping-working properties, weather resistance and chemical resistance, and that can be used for various decorations, displays and packages; a process for producing the sheet; and a shaped body.

The inventors have found out that: a network structure in which a tough polymer chain is linked with a flexible polymer chain is formed by crosslinking three-dimensionally a side chain portion of a resin, in which a vinyl polymer having toughness and weather resistance is used as a main chain, in which the side chain has a polyether, polyester, polycarbonate or polybutadiene structure having a functional group that can react with an isocyanate group and having extensibility and flexibility and is introduced into the main chain, with a polyisocyanate, and that it is possible to form a sheet which is tough even if the sheet is in a monolayer form, has extensibility and flexibility, and also has superior shaping-working properties, using the resin. Furthermore, it has been found out that the crosslinking density of the sheet is increased and the weather resistance and the chemical resistance of the sheet are improved by introducing a functional group that can react with an isocyanate group into the vinyl polymer main chain and crosslinking three-dimensionally this, directly or through some other flexible component, with the polyisocyanate. As a result, the invention has been made.

That is, the invention relates to a resin composition comprising: a vinyl polymer (A) having, at a side chain thereof, at least one structure selected from polyether, polyester, polycarbonate or polybutadiene which has a functional group that can react with an isocyanate group; and a polyisocyanate compound (B) having at least two isocyanate groups.

The invention also relates to the above-mentioned resin composition, further comprising at least one (C) selected from polyether, polyester, polycarbonate or polybutadiene which has at least two functional groups that can react with isocyanate groups.

The invention also relates to any one of the above-mentioned resin composition, wherein the polymer (A) is a graft polymer obtained by a condensation reaction between a copolymer (a) of an unsaturated dibasic acid and another monomer having an ethylenic unsaturated double bond, and at least one (b) selected from polyether, polyester, polycarbonate, or polybutadiene, which has a functional group that can react with a carboxyl group and a functional group that can react with an isocyanate group.

The invention also relates to any one of the above-mentioned resin composition, wherein the polymer (A) is a graft polymer obtained by a condensation reaction between a copolymer (a) of an unsaturated dibasic acid (a1), a monomer (a2), which is a monomer other than the unsaturated dibasic acid (a1) and has a functional group that can react with an isocyanate and an ethylenic unsaturated double bond, and a monomer (a3), which is a monomer other than the unsaturated dibasic acid (a1) and the monomer (a2) and has an ethylenic unsaturated double bond, and at least one (b) selected from polyether, polyester, polycarbonate or polybutadiene, which has a functional group that can react with a carboxyl group and a functional group that can react with an isocyanate group.

The invention also relates to any one of the above-mentioned resin compositions further comprising a colorant.

The invention also relates to a sheet made of a hardened body of any one of the above-mentioned resin compositions.

The invention also relates to the above-mentioned sheet which has, on a single surface or both surfaces thereof, an adhesive layer.

The invention also relates to a process for producing a sheet comprising the steps of: applying any one of the above-mentioned resin compositions onto a peelable sheet; and hardening the resultant layer.

The invention also relates to a shaped body formed by shaping the above-mentioned sheet.

BEST MODES FOR CARRYING OUT THE INVENTION

The vinyl polymer (A) constituting the present invention and having, at a side chain thereof, at least one structure selected from polyether, polyester, polycarbonate or polybutadiene which has a functional group that can react with an isocyanate group is used in order to give pigment-dispersibility to the resin composition and, in the case where a sheet is made from the resin composition, in order to give toughness, extensibility, flexibility, shaping-working properties, weather resistance and chemical resistance to the sheet.

The polymer (A) means a polyether, polyester, polycarbonate, or polybutadiene graft vinyl polymer wherein at least one structure selected from polyether, polyester, polycarbonate, or polybutadiene, which has a functional group that can react with an isocyanate group is introduced, as a side chain, into a main chain of a vinyl copolymer which can be obtained by polymerizing a monomer having an ethylenic unsaturated double bond.

Examples of the functional group that can react with an isocyanate group include a hydroxyl group, an amino group, a carboxyl group, an epoxy group, an N-methylol group and an N-alkoxymethyl group. A hydroxyl group is preferable from the viewpoint of reactivity and the shaping-working properties of the resultant sheet.

The method for introducing the side chain is not particularly limited. For example, the side chain can be introduced by synthesizing a copolymer (a) of an unsaturated dibasic acid and another monomer having an ethylenic unsaturated double bond, and then causing the copolymer (a) and at least one (b) selected from polyether, polyester, polycarbonate, or polybutadiene, which has a functional group that can react with a carboxyl group and a functional group that can react with an isocyanate group, to condensation-react with each other at positions of the carboxylic acid or carboxylic acid anhydride moiety of the copolymer (a) and the functional group of said at least one (b) that can react with a carboxyl group.

In the case where the composition is used for a purpose requiring higher toughness and weather resistance, it is preferable to introduce a functional group that can react with an isocyanate group directly into the vinyl polymer main chain in order to obtain a higher crosslinking density. In this case, the polymer (A) can be obtained by a condensation reaction between the copolymer (a) made of an unsaturated dibasic acid (a1), a monomer (a2), which is a monomer other than the unsaturated dibasic acid (a1) and has a functional group that can react with an isocyanate and an ethylenic unsaturated double bond, and a monomer (a3), which is a monomer other than the unsaturated dibasic monomer (a1) and the monomer (a2) and has an ethylenic unsaturated double bond, and at least one (b) selected from polyether, polyester, polycarbonate or polybutadiene, which has a functional group that can react with a carboxyl group and a functional group that can react with an isocyanate group.

Examples of the unsaturated dibasic acid (a1) which can be used for the synthesis of the copolymer (a) include maleic acid, maleic anhydride, fumaric acid, mesaconic acid, citraconic acid, itaconic acid, crotonic acid, and diphenylmethane-di-γ-ketocrotonic acid.

The unsaturated dibasic acid (a1) can be used alone or in combination in accordance with required performance. The proportion of the dibasic acid (a1) in monomers which are starting materials of the copolymer (a) is preferably from 0.01 to 30% by weight, and more preferably from 0.05 to 10% by weight. If the proportion of the unsaturated dibasic acid (a1) is more than 30% by weight, the stability of the resultant polymer (A) falls. If the proportion is less than 0.01% by weight, the extensibility and flexibility of the resultant sheet becomes insufficient.

As the monomer (a2) which is a monomer other than the unsaturated dibasic acid (a1) and has a functional group that can react with an isocyanate and an ethylenic unsaturated double bond, a(meth)acrylic monomer, a vinyl monomer and the like which has a functional group that can react with an isocyanate group can be used. Particularly a(meth)acrylic monomer is preferable from the viewpoints of reactivity and the shaping-working properties of the resultant sheet.

Examples of the functional group that can react with an isocyanate group include a hydroxyl group, an amino group, a carboxyl group, an epoxy group, an N-methylol group, and an N-alkoxymethyl group. A hydroxyl group is preferable from the viewpoints of reactivity and the shaping-working properties of the resultant sheet.

Examples of the (meth)acrylic monomer having a hydroxyl group include 2-hydroxylethyl(meth)acrylate, 1-hydroxypropyl (meth)acrylate, 2-hydroxypropyl(meth) acrylate, 4-hydroxybutyl(meth)acrylate, polyethylene glycol mono(meth)acrylate, polypropylene glycol mono(meth) acrylate and polytetramethylene glycol mono(meth)acrylate.

Examples of the (meth)acrylic monomer having an amino group include monoalkylaminoalkyl(meth)acrylates such as methylaminoethyl(meth)acrylate, ethylaminoethyl (meth) acrylate, butylaminoethyl(meth)acrylate or t-butylaminoethyl (meth)acrylate; and N,N-dialkylaminoalkyl (meth)acrylates such as N,N-dimethylaminoethyl(meth)acrylate, N,N-diethylamino(meth)acrylate or N,N-dibutylaminoethyl (meth)acrylate.

Examples of the (meth)acrylic monomer having a carboxyl group include acrylic acid, and methacrylic acid.

An example of the (meth)acrylic monomer having an epoxy group is glycidyl(meth)acrylate.

An example of the (meth)acrylic monomer having an N-methylol group is N-methylol(meth)acrylamide.

Examples of the (meth)acrylic monomer having an N-alkoxymethyl group include (meth)acrylamides having an N-monoalkoxymethy group such as N-methoxymethyl (meth)acrylamide, N-ethoxymethyl(meth)acrylamide, N-propoxymethyl(meth)acrylamide or N-butoxymethyl (meth)acrylamide; and (meth)acrylamides having N,N-dialkoxymethyl groups such as N,N-dimethylol(meth)acrylamide, N,N-di(methoxymethyl)(meth)acrylamide, N,N-di (ethoxymethyl)(meth)acrylamide, N,N-di(propoxymethyl) (meth)acrylamide or N,N-di(butoxymethyl)(meth) acrylamide.

Examples of the vinyl monomer include hydroxystyrene and vinyl alcohol.

The monomer (a2) which is a monomer other than the unsaturated dibasic acid (a1) and has a functional group that can react with an isocyanate and an ethylenic unsaturated double bond can be used alone or in combination in accordance with required performance. The proportion of the monomer (a2) in monomers which are starting materials of the copolymer (a) is preferably from 0.01 to 50% by weight, more preferably from 0.1 to 20% by weight, and particularly preferably from 0.1 to 10% by weight. If the proportion of the monomer (a2) is more than 50% by weight, the storage stability of the resultant polymer (A) falls. If the proportion is less than 0.01% by weight, the pigment-dispersibility of the resin composition and the toughness and the weather resistance of the resultant sheet deteriorate.

As the monomer (a3) which is a monomer other than the unsaturated dibasic acid (a1) and the monomer (a2) and has an ethylenic unsaturated double bond, a(meth)acrylic monomer, an aromatic vinyl monomer, an olefin based hydrocarbon monomer, a vinyl ether monomer and the like can be used.

Examples of the (meth)acrylic monomer include alkyl (meth)acrylates such as methyl(meth)acrylate, ethyl (meth) acrylate, butyl(meth)acrylate, hexyl(meth)acrylate, 2-ethylhexyl(meth)acrylate or stearyl(meth)acrylate; and benzyl (meth)acrylate.

Examples of the aromatic vinyl monomer include styrene, methylstyrene, and ethylstyrene.

Examples of the olefin based hydrocarbon monomer include ethylene, propylene, butadiene, isobutylene, isoprene and 1,4-pentadiene.

An example of the vinyl ether monomer is vinyl methyl ether.

The monomer (a3) which is a monomer other than the unsaturated dibasic acid (a1) and the monomer (a2) and has an ethylenic unsaturated double bond can be used alone or in combination in accordance with required performance.

The copolymer (a) can be obtained by a known method, for example, solution polymerization. Examples of a usable solvent include alcohols such as methanol, ethanol, propanol, butanol, ethylene glycol methyl ether or diethylene glycol methyl ether; ketones such as acetone, methyl ethyl ketone, methyl isobutyl ketone or cyclohexanone; ethers such as tetrahydrofuran, dioxane, ethylene glycol dimethyl ether or diethylene glycol dimethyl ether; hydrocarbons such as hexane, heptane or octane; aromatic series such as benzene, toluene, xylene or cumene; and esters such as ethyl acetate or butyl acetate. The solvent may be used as a mixture of two or more kinds thereof.

At the time of the synthesis, the concentration of the charged monomers is preferably from 0 to 80% by weight.

As the polymerization initiator, a peroxide or an azo compound, such as benzoyl peroxide, azoisobutylvaleronitrile, azobisisobutyronitrile, di-t-butylperoxide, t-butylperbenzoate, t-butylperoctoate, or cumenehydroxyperoxide can be used. The polymerization temperature is preferably from 50 to 200° C., and particularly preferably from 70 to 140° C.

The weight average molecular weight of the copolymer (a), relative to polystyrene standards, is preferably from 5,000 to 500,000, and more preferably from 10,000 to 100,000. If the weight average molecular weight of the copolymer (a) is more than 500,000, the extensibility of the resultant sheet lowers. If it is less than 5,000, the toughness and the chemical resistance of the resultant sheet deteriorate.

The glass transition temperature of the copolymer (a) is preferably from 0 to 150° C., and more preferably from 10 to 100° C. If the glass transition temperature of the copolymer (a) is more than 150° C., the extensibility of the resultant sheet lowers. If the temperature is less than 0° C., the chemical resistance and the surface hardness of the resultant sheet deteriorate.

As the compound (b), for example, polyether, polyester, polycarbonate or polybutadiene which has, at a terminal of the linear chain thereof or a branched terminal thereof, at least one functional group that can react with a carboxyl group and at least one functional group that can react with an isocyanate group can be used. Particularly preferred is the polyester from the viewpoints of the balance between the extensibility and the toughness of the resultant sheet, and the shaping-working properties thereof.

Examples of the functional group of the compound (b) that can react with a carboxyl group include a hydroxyl group, an epoxy group, an amino group, and an isocyanate group. A hydroxyl group is preferable from the viewpoint of reactivity and the shaping-working properties of the resultant sheet. Examples of the functional group of the compound (b) that can react with an isocyanate group include a hydroxyl group, an amino group, a carboxyl group, an epoxy group, an N-methylol group and an N-alkoxymethyl group. A hydroxyl group is preferable from the viewpoint of reactivity and the shaping-working properties of the resultant sheet. The functional group of the compound (b) that can react with a carboxyl group and the functional group of the compound (b) that can react with an isocyanate group may be the same functional group or different functional groups.

Examples of the polyester include terminal hydroxyl group-containing ester compounds obtained by esterifying at least one dicarboxylic acid and at least one of polyols such as polyhydric alcohols, polyhydric phenols or alkoxy-modified products thereof; and ester compounds obtained by modifying the terminal hydroxyl group of the ester compounds to an amino group, carboxyl group, an epoxy group, an N-methylol group or an N-alkoxymethyl group.

Examples of the dicarboxylic acid include terephthalic acid, isophthalic acid, orthophthalic acid, 1,5-naphthalic acid, p-oxybenzoic acid, p-(hydroxy)benzoic acid, 1,4-cyclohexanedicarboxylic acid, succinic acid, adipic acid, azelaic acid, sebacic acid, and dodecanedicarboxylic acid.

Examples of the polyhydric alcohol include 1,3-propanediol, 2-methyl-1,3-propanediol, 1,4-butanediol, 2-methyl-1,4-butanediol, 1,2-dimethyl-1,4-butanediol, 2-ethyl-1,4-butanediol, 1,5-pentanediol, 2-methyl-1,5-pentanediol, 3-methyl-1,5-pentanediol, 2,2,4-trimethyl-1,3-pentanediol, 3-ethyl-1,5-pentanediol, 1,6-hexanediol, 2-methyl-1,6-hexanediol, 3-methyl-1,6-hexanediol, 1,7-heptanediol, 2-methyl-1,7-heptanediol, 3-methyl-1,7-heptanediol, 4-methyl-1,7-heptanediol, 1,8-octanediol, 2-methyl-1,8-octanediol, 2-ethyl-1,8-octanediol, 3-methyl- 1,8-octanediol, 4-methyl-1,8-octanediol, 1,9-nonanediol, ethylene glycol, propylene glycol, neopentyl glycol, diethylene glycol, dipropylene glycol, cyclohexanedimethanol, polyethylene glycol, polypropylene glycol, polytetramethylene glycol, trimethylolpropane, 1,1,1-trimethylolpropane ethylene glycol, glycerin, erythyritol, xylytol, sorbitol, and mannitol.

Examples of the polyhydric phenol include catecol, resorcin, hydroquinone, hexylresorcin, trihydroxybenzene, and dimethylolphenol.

Examples of the polyester which has at least two hydroxyl groups (polyester polyol) and is commercially available include Kuraray Polyol P-510, P-1010, P-1510, P-2010, P-3010, P-4010, P-5010, P-6010, P-2011, P-2013, P-520, P-1020, P-2020, P-1012, P-2012, P-530, P-1030, P-2030, PMHC-2050, PMHC-2050R, PMHC-2070, PMHC-2090, PMSA-1000, PMSA-2000, PMSA-3000, PMSA-4000, F-2010, F-3010, N-2010, PNOA-1010, PNOA-2014, and O-2010, each of which is manufactured by Kuraray Co., Ltd.; Desmophen 650 MPA, 651 MPA/X, 670, 670 BA, 680 X, 680 MPA, 800, 800 MPA, 850, 1100, 1140, 1145, 1150, 1155, 1200, 1300 X, 1652, 1700, 1800, RD 181, RD 181 X, and C200, each of which is manufactured by Sumitomo Bayer Urethane Co., Ltd.; and Vylon 200, 560, 600, GK 130, GK 860, GK 870, 290, GK 590, GK 780, and GK 790, each of which is manufactured by Toyobo Co., Ltd.

Examples of the polyether include polyalkylene glycols such as polyethylene glycol, polypropylene glycol or polytetramethylene glycol; and ether compounds obtained by modifying the terminal hydroxyl group of the polyalkylene glycols to an amino group, a carboxyl group, an epoxy group, an N-methylol group or an N-alkoxymethyl group. Examples of the polyether which has at least two hydroxyl groups. (polyether polyol) and is commercially available include Desmophen 250U, 550U, 1600U, 1900U, 1915U and 1920D, each of which is manufactured by Sumitomo Bayer Urethane Co., Ltd.

Examples of the polycarbonate include polycarbonate diols represented by the following formula: and carbonate compounds obtained by modifying the terminal hydroxyl group of the polycarbonate diols to an amino group, a carboxyl group, an epoxy group, an N-methylol group or an N-alkoxymethyl group.

H—(O—R—OCO—)nR—OH (R: an alkylene chain, diethylene glycol, or the like)

Examples of the polycarbonate which has at least two hydroxyl groups and is commercially available include Kuraray Polyol PNOC-1000, PNOC-2000, PMHC-2050, PMHC-2050R, PMHC-2070, PMHC-2070R, PMHC-2090R, and C-2090, each of which is manufactured by Kuraray Co., Ltd.

Examples of the polybutadiene include α,β-polybutadiene glycol, α,β-polybutadiene glycol, and butadiene compounds obtained by modifying the terminal hydroxyl group of the above-described glycols to an amino group, a carboxyl group, an epoxy group, an N-methylol group or an N-alkoxymethyl group. Examples of the polybutadiene which has at least two hydroxyl groups and is commercially available include NISSO-PB G-1000, G-2000, G-3000, GI-1000, GI-2000, GI-3000, GQ-1000 and GQ-2000, each of which is manufactured by Nippon Soda Co., Ltd. Examples of the polybutadiene which has at least two epoxy groups and is commercially available include NISSO-PBBF-1000, EPB-13, and EPB-1054, each of which is manufactured by Nippon Soda Co., Ltd.

The weight average molecular weight of the compound (b) relative to polystyrene standards is preferably from 500 to 25,000, and more preferably from 1,000 to 100,000. If the weight average molecular weight of the compound (b) is more than 25,000, the solubility thereof in a solvent, the compatibility thereof with the copolymer (a), and the reactivity thereof with the copolymer (a) lower and the toughness of the resultant sheet also lowers. If the molecular weight is less than 500, sufficient extensibility and flexibility cannot be given to the sheet.

The polymer (A) can be obtained by causing the carboxylic acid or carboxylic acid anhydride moiety of the copolymer (a) to react with the functional group of the compound (b) that can react with an carboxyl group by a known method, for example, by esterification in the case where the functional group of the compound (b) that can react with a carboxyl group is a hydroxyl group or an epoxy group, by amide conversion in the case where the functional group is an amino group, or by imide conversion in the case where the functional group is an isocyanate group. As the solvent, the solvent used at the time of the synthesis of the copolymer (a) can be used as it is. Furthermore, a different solvent may be added to a reaction system or the solvent contained in the system may be removed in accordance with conditions of synthesis, conditions of application, or other factors.

As a catalyst for the reaction, for example, a tertiary amine such as triethylamine, triethanolamine or ethylenediamine is used. The reaction temperature is preferably from 50 to 300° C.

As for the reaction ratio of the copolymer (a) and the compound (b), the amount of the functional group of the compound (b) that can react with a carboxyl group is preferably from 0.01 to 10 moles, more preferably from 0.1 to 5 moles, and still more preferably from 0.5 to 2 moles per mole of the carboxylic acid or carboxylic acid anhydride of the copolymer (a). If the reaction ratio of the compound (b) is more than 10 moles, coatability of the resin composition and toughness of the sheet are damaged. If the reaction ratio is less than 0.01 mole, extensibility and flexibility of the resultant sheet lower.

One copolymer (a) may be used or copolymers (a) can be used in combination in accordance with purpose or desired physical properties. Also, one compound (b) can be used or compounds (b) can be used in combination in accordance with purpose or desired physical properties.

In the case where the polymer (A) has a hydroxyl group, the hydroxyl value thereof is preferably from 0.1 to 300 KOHmg/g, more preferably from 1 to 100 KOHmg/g, and particularly preferably from 1 to 50 KOHmg/g on the basis of weight of solid contents. If the hydroxyl value of the polymer (A) is more than 300 KOHmg/g, storage stability of the polymer (A) lowers. If the hydroxyl value is less than 0.1 KOHmg/g, pigment dispersibility of the resin composition and toughness, extensibility and chemical resistance of the resultant sheet deteriorate.

The weight average molecular weight of the polymer (A) relative to polystyrene standards is preferably from 5,000 to 500,000, and more preferably from 10,000 to 100,000. If the weight average molecular weight of the polymer (A) is more than 500,000, solubility of the polymer (A) in a solvent and extensibility of the resultant sheet lower. If the molecular weight is less than 5,000, toughness and chemical resistance of the resultant sheet lower.

The polyisocyanate compound (B) constituting the invention and having at least two isocyanate groups is used in order to crosslink the polymer (A) and the polymer (A) and, in the case where a compound (C) which will be described later is used, in order to crosslink the polymer (A) and the compound (C) and/or the compound (C) and the compound (C), so as to form a tough sheet having extensibility, flexibility, shaping working properties and chemical resistance.

In the case where the resultant sheet is used for outer packing, it is preferable to use only an alicyclic or aliphatic compound in order to prevent change of color from yellow to brawn over time.

Examples of the alicyclic polyisocyanate compound include isophorone diisocyanate, hydrogenated tolylene diisocyanate, and hydrogenated 4,4'-diphenylmethane diisocyante.

Examples of the aliphatic polyisocyanate compound include trimethylhexamethylene diisocyanate, 4,4'-diphenylmethane diisocyanate, hexamethylene diisocyanate, and lysine diisocyanate.

Examples of an aromatic polyisocyanate compound include diphenylmethane diisocyanate, toluylene diisocyanate, naphthylene-1,5-diisocyanate, o-xylene diisocyanate, m-xylene diisocyanate, p-xylene diisocyanate, triphenylmethane triisocyanate, and polymethylene polyphenyl isocyanate.

As the polyisocyanate compound, adducts having isocyanate groups at terminals thereof and obtained by adding the above-mentioned compound to a glycol or diamine, a biuret modified product, or an isocyanurate modified product may be used.

In particular, a case where the polyisocyanate compound (B) contains an isocyanurate modified product, in particular, isocyanurate ring-containing triisocyanate is preferable since a sheet having higher toughness and extensibility can be obtained. Specific examples of the isocyanurate ring-containing triisocyanate include isocyanurate modified isophorone diisocyanate (for example, Desmodur Z4470, manufactured by Sumitomo Bayer Urethane Co., Ltd.), isocyanurate modified hexamethylene diisocyanate (for example, Sumidur N3300, manufactured by Sumitomo Bayer Urethane Co., Ltd.), and isocyanurate modified toluylene diisocyante (for example, Sumidur FL-2, FL-3, FL-4 and HL BA, manufactured by Sumitomo Bayer Urethane Co., Ltd.).

A block modified product, wherein the isocyanate group of the above-mentioned polyisocyanate compound is caused to react with a blocking agent such as methanol, ethanol, n-pentanol, ethylene chlorhydrine, isopropyl alcohol, phenol, p-nitrophenol, m-cresol, acetylacetone, ethyl acetoacetate, or ϵ-caprolactam can be used.

A prepolymer having isocyanate groups at terminals thereof, which is obtained by causing at least one (c) selected from polyether, polyester, polycarbonate or polybutadiene, which has at least two functional groups that can react with isocyanate groups and a diisocyanate compound (d) having, at both terminals thereof, isocyanate groups to react with each other can be used as the polyisocyanate compound (B). In the case where the compound (B) contains the above-mentioned prepolymer having isocyanate groups at terminals thereof, extensibility can be obtained even if a small amount thereof is used and the toughness of the coating membrane is not damaged.

As the compound (c), the same compound as the compound (b) can be used. Examples of the compound (d) include toluylene diisocyanate, naphthylene-1,5-diisocyanate, o-toluylene diisocyanate, diphenylmethane diisocyanate, trimethylhexamethylene diisocyanate, isophorone diisocyanate, 4,4'-diphenylmethane diisocyanate, hexamethylene diisocyanate, m-xylene diisocyanate, p-xylene diisocyanate, lysine diisocyanate, hydrogenated 4,4'-diphenylmethane diisocyanate, and hydrogenated tolylene diisocyanate.

The prepolymer having isocyanate groups at terminals thereof can be obtained by mixing the compound (c) with the compound (d) at such a ratio that the amount of the isocyanate group of the compound (d) is more than one mole with respect to one mole of the functional group of the compound (c) that can react with an isocyanate group, and heating and stirring the mixture so as to react these compounds. The weight average molecular weight of the prepolymer, relative to polystyrene standards, is preferably from 500 to 50,000, more preferably from 1,000 to 50,000, and particularly preferably from 1,000 to 10,000. If the weight average molecular weight of the prepolymer is more than 50,000, solubility of the prepolymer in a solvent and compatibility of the prepolymer with other components lower. If the molecular weight is less than 500, toughness and extensibility of the resultant are insufficient.

One polyisocyanate compound (B) or polyisocyanate compounds (B) maybe used in accordance with required properties, so that the total number of isocyanate groups thereof is preferably from 0.1 to 5.0 times, more preferably from 0.5 to 3.0 times, and particularly preferably from 0.8 to 2.0 times as many as the total number of the functional groups of the polymer (A).

In order to give flexibility and extensibility to the sheet, give pigment-dispersibility to the resin composition, increase crosslinking density of the polymer (A), and improve toughness, extensibility and flexibility of the sheet, the resin composition of the invention preferably contains at least one (C) selected from polyether, polyester, polycarbonate or polybutadiene, which has at least two functional groups that can react with isocyanate groups.

The compound (C) is polyether, polyester, polycarbonate or polybutadiene, which has, at the terminal of a linear chain thereof or a branched terminal thereof, at least two functional groups that can react with isocyanate groups. The polyester is particularly preferable from the viewpoints of balance between extensibility and toughness of the resultant sheet, and shaping-working properties thereof.

Examples of the functional groups that can react with isocyanate groups include hydroxyl, amino, carboxyl, epoxy, N-methylol and N-alkoxymethyl groups. A hydroxyl group is preferable from the viewpoints of reactivity and shaping-working properties of the resultant sheet.

The number of the functional groups that can react with isocyanate groups is particularly preferably 3 since extensibility can be obtained even if the amount of the compound (C) is smaller than in the case where the number is two and toughness of the coating membrane is not damaged.

As the compound (C), the same compound as the compound (b) can be used.

The weight average molecular weight of the compound (C), relative to polystyrene standards, is preferably from 500 to 25,000, and more preferably from 1,000 to 10,000. If the weight average molecular weight of the compound (C) is more than 25,000, solubility of the compound (C) in a solvent lowers and extensibility of the resultant sheet lowers. If the molecular weight is less than 500, compatibility of the compound (C) with other components lowers and a homogeneous and smooth sheet cannot be easily formed. Additionally, toughness of the resultant sheet lowers.

One compound (C) can be used or compounds (C) can be used in combination in accordance with required properties. In the case where the resultant sheet is used for outer packaging, it is preferable to use only an alicyclic compound or aliphatic compound in order to prevent color change of the sheet from yellow to brown over time.

The mixture ratio (weight ratio) of the polymer (A) and the compound (C) is preferably from 95:5 to 10:90, more preferably from 95:5 to 30:70, and particularly preferably from 95:5 to 50:50. If the ratio of the compound (C) is more than 90, toughness and chemical resistance of the resultant sheet lower.

In the case where the compound (C) is used, one polyisocyanate compound (B) may be used or polyisocyanate compounds (B) can be used in combination in accordance with required properties so that the total number of isocyanate groups thereof is preferably from 0.1 to 5.0 times, more preferably from 0.5 to 3.0 times, and particularly preferably from 0.8 to 2.0 times as many as the total number of the functional groups of the polymer (A) and the functional groups of the compound (C).

The compound (C) and the compound (B) may be caused to react with each other beforehand, so as to prepare an isocyanate-terminated prepolymer. In this case, the resin composition contains the polymer (A) and the isocyanate-terminated prepolymer obtained by causing the compound (C) and the compound (B) to react with each other.

In order to promote crosslinking reaction of the polymer (A) and the compound (C), which is used if necessary, with the compound (B), the resin composition of the invention may contain any crosslinking catalyst in accordance with the functional groups of the respective components. Typical examples of the crosslinking catalyst include organic metal compounds; acids and ammonium salts, lower amine salts and polyvalent metal salts thereof; amines; and organic peroxides.

Specific examples of the organic metal compounds include sodium acetate, tin octanoate, lead octanoate, cobalt octanoate, zinc octanoate, calcium octanoate, lead naphthenate, cobalt naphthenate, dibutyltin dioctate, dibutyltin dilaurate, dibutyltin maleate, dibutyltin di(2-ethylhexoate), diethylzinc, and tetra(n-butoxy)titanium.

Specific examples of the acids include trichloroacetic acid, phosphoric acid, monoalkylphosphoric acid, dialkylphosphoric acid, phosphoric acid esters of hydroxy(ethyl)(meth)acrylate, monoalkylphosphorous acid, dialkylphosphorous acid, p-toluenesulfonic acid, phthalic anhydride, benzoic acid, benzenesulfonic acid, dodecylbenzenesulfonic acid, formic acid, acetic acid, propionic acid, itaconic acid, oxalic acid, and maleic acid.

Specific examples of the amines include dicyclohexylamine, triethylamine, N,N-dimethylbenzylamine, N,N,N',N'-tetramethyl-1,3-butanediamine, diethanolamine, triethanolamine, and cyclohexylethylamine.

Examples of organic peroxide include hydroperoxide, cumene hydroperoxide, diisopropylbenzene hydroperoxide, cyclohexanone peroxide, di-t-butyl peroxide, dicumyl peroxide, diacetyl peroxide, benzoyl peroxide, t-butyl peroxy-2-ethylhexanoate, and t-butyl peroxylaurate.

In the case where the functional group of the polymer (A) or the compound (C) is a hydroxyl group, it is preferable to use an acid, an ammonium salt thereof, a lower amine salt thereof, a polyvalent metal salt thereof, or the like among these crosslinking catalysts. In the case where the functional group is an amino group, it is preferable to use an organic peroxide, an acid anhydride, a carboxylic acid, zinc oxide-magnesium, or the like. In the case where the functional group is a carboxyl group, it is preferable to use an acid, an ammonium salt thereof, a lower amine salt thereof, a polyvalent metal salt thereof, or the like. In the case where the functional group is an epoxy group, it is preferable to use an organic metal compound, an amine or the like. In the case where the functional group is an N-methylol or N-alkoxymethyl group, it is preferable to use an acid, an ammonium salt thereof, a lower amine salt thereof, a polyvalent metal salt thereof, or the like.

These crosslinking catalysts may be used in combination of two or more thereof, and the total used amount thereof is from 0.01 to 10%, and preferably from 0.1 to 5% by weight with respect to 100% by weight of the polymer (A), the compound (B) and the compound (C).

If necessary, the resin composition may contain any colorant such as a pigment or dye to such an extent that the advantageous effects of the invention are not damaged.

As the pigment, any pigment which is conventionally known may be used. Any pigment having high light resistance and weather resistance is particularly preferable. Specific examples thereof include qunacridones, anthraquinones, perylenes, perynones, diketopyrrolopyrroles, isoindolinones, condensed azos, benzimidazolones, monoazos, insoluble azos, naphthols, flavanthrones, anthrapyrimidines, quinophthalones, pyranthrones, pyrazolones, thioindigos, anthanthrones, dioxazines, phthalocyanines, indanthrones, and other type organic pigments; metal complexes such as nickel dioxine yellow and copper azo methine yellow, metal oxides such as titanium oxide, iron oxide and zinc oxide, metal salts such as barium sulfate and calcium carbonate, carbon black, aluminum, mica, or other inorganic pigments; metal fine particles of aluminum and other metals; and mica fine particles.

Examples of the dye include azos, quinolines, stylbenes, thiazoles, indigoids, anthraquinones, and oxazines.

The colorant may be used in the form of powder. Alternatively, the colorant may be used in the form of a coloring paste, coloring pellet, or some other form.

In order to raise the strength of the sheet, the resin composition of the invention may contain any thermoplastic resin other than the polymer (A) and the compound (C) to such an extent that the advantageous effects of the invention are not damaged.

Examples of the thermoplastic resin include polypropylene, polyethylene, ethylene/vinyl acetate copolymer, polyisobutylene, polybutadiene, polystyrene, polycarbonate, polymethylpentene, ionomers, acrylonitrile/butadiene/styrene resin, acrylic resin, polyvinyl alcohol, polyamide resin, polyacetal, and polyester.

The addition amount of the thermoplastic resin other than the polymer (A) and the compound (C) is preferably 50% or less by weight, and more preferably 30% or less by weight of the total of the polymer (A) and the compound (C). If the amount is more than 50% by weight, compatibility of the thermoplastic resin with other components may deteriorate.

If necessary, the resin composition of the invention may contain any additive such as an ultraviolet absorbent, an ultraviolet stabilizer, a radical supplementing agent, a filler, a thixotropy imparting agent, an age resistor, an antioxidant, an antistatic agent, a flame retardant, a thermal conductivity improving agent, a plasticizer, a sagging inhibitor, a stain-proofing agent, an antiseptic, a bactericide, an antifoaming agent, a leveling agent, a blocking inhibitor, a hardening agent, a thickener, a pigment dispersant, or a silane coupling agent, to such an extent that the advantageous effects of the invention are not damaged.

The resin composition of the invention can be obtained by mixing the polymer (A) and the compound (B) and, if necessary, the compound (C), the colorant, the crosslinking catalyst, the additive and a solvent.

As the solvent, an appropriate solvent selected from the following is used in accordance with the composition of the resin composition: alcohols such as methanol, ethanol, propanol, butanol, ethylene glycol methyl ether, or diethylene glycol methyl ether; ketones such as acetone, methyl ethyl ketone, methyl isobutyl ketone, or cyclohexanone; ethers such as tetrahydrofuran, dioxane, ethylene glycol dimethyl ether, or diethylene glycol dimethyl ether; hydrocarbons such as hexane, heptane, or octane; aromatics series such as benzene, toluene, xylene or cumene; and esters such as ethyl acetate or butyl lactate. At least two kinds of the solvent may be used.

The method of mixing is not particularly limited. Usually, the compound (C), the compound (B) and the other components are mixed with the polymer solution obtained by polymerization of the polymer (A), and then the mixture is stirred by means of a stirring blade, a shaking stirrer, a rotation stirrer, or the like. The components may be mixed by means of a sand mill, three rolls, two rolls, or the like. Furthermore, a solvent may be added to the mixture or the mixture may be concentrated in order to improve coatability thereof.

In the case where the resin composition of the invention contains the colorant, in particular, the pigment, it is preferable to prepare first a pigment paste wherein the colorant, the dispersing resin, and an optional dispersant and the solvent are mixed with each other, and subsequently mix the paste with other components. It is preferable to use the compound (C) as the dispersing resin. However, the kind of the dispersing resin is not particularly limited. The following can be used: acrylic resin, polyurethane resin, polyurea resin, polyester resin or some other resin which has a polar group having superior pigment-dispersibility, for example, a hydroxyl group, a carboxyl group, a thiol group, an amino group, an amide group, or a ketone group. Examples of the dispersant include a pigment derivative, an anionic surfactant, an amphoteric surfactant, a nonionic surfactant, a titanium coupling agent, and a silane coupling agent. The surface of the pigment can be reformed by a metal chelate, a resin coat or the like.

The thus-obtained resin composition of the invention is applied onto a peelable sheet, and hardened, so as to be made into a film. Thus, a sheet made of a hardened body of the resin composition of the invention can be prepared. As the peelable sheet, for example, paper, a plastic film made of polyester, polypropylene, polyethylene, cellulose acetate or the like, or a metal foil made of aluminum, stainless steel or the like can be used. Such a sheet having a thickness of 10 to 250 μm can be preferably used.

The application of the resin composition of the invention can be performed by a method which is conventionally known, for example, a gravure coating method, a kiss coating method, a die coating method, a lip coating method, a comma coating method, a blade coating method, a roll coating method, a knife coating method, a curtain coating method, a slot orifice method, a spray coating method, or a bar coating method. The resin composition maybe applied by several separate operations, or maybe applied one time. Plural methods may be combined.

The film thickness of the applied resin composition is usually from about 10 to 200 μm. However, the film thickness is not limited to this range, and may be adjusted according to purpose or required properties.

The hardening of the resin composition may be performed at a temperature suitable for the kind of the resin composition, the kind and the film thickness of the peelable sheet, and the use purpose of the composition for a time suitable for above conditions. The hardening is usually performed at a temperature ranging from room temperature to 350° C. From the viewpoints of improvement in hardening efficiency and in productivity, it is preferable to heat the composition to 30 to 350° C. and perform hardening.

If necessary, the sheet of the invention obtained by the above-mentioned method can have an adhesive layer on one surface or both surfaces thereof. In this case, the peelable sheet, which covers the layer made of the hardened body of the resin composition, may be left as it is or may be peeled. In the case where the adhesive layer is formed on both surfaces thereof, the peelable sheet is peeled.

Examples of the adhesive include a rubber type adhesive made mainly of ordinary natural rubber, synthetic isoprene rubber, regenerated rubber, styrene/butadiene rubber, polyisoprene rubber, styrene/isoprene/styrene rubber, or the like; an acrylic adhesive made mainly of a copolymer wherein a(meth)acrylate ($C_2$ to $C_{12}$), as a main component, is copolymerized with a monomer such as acrylic acid, methacrylic acid, acrylamide, vinyl acetate or styrene; a urethane adhesive; and a silicone adhesive. An agent having an adhesive strength suitable for purpose, and the material of the adherend can be selected.

The adhesive layer may be laminated by a method which is conventionally known, for example, a kiss coating method, a die coating method, a lip coating method, a comma coating method, a blade coating method, and a bar coating methods, in accordance with the kind and coatability of the adhesive, so as to apply the adhesive layer directly onto the sheet made of the hardened body of the resin composition, or a method of applying an adhesive once onto a process sheet and then transfer this adhesive onto the sheet made of the hardened body of the resin.

The sheet of the invention is used as various decorating, coloring and displaying materials such as outer casing, interior materials, building materials, various guide plates, traffic signs, indoor/outdoor advertisements, signboards, shutters, or windows; as a sheet for giving any surface function such as weather resistance, stain-proofing property or various resistances; or as a packaging material for preventing deterioration in the quality of various articles or for protecting various functions of various articles.

The shaped body of the invention can be obtained by shaping the sheet of the invention.

As the shaped sheet, (1) a sheet made of only the hardened body of the resin composition of the invention which contains the colorant, (2) a laminated sheet wherein the sheet of the hardened body of the resin composition of the invention which contains the colorant and a resin sheet are bonded to each other through an adhesive, (3) a laminated sheet wherein the hardened body of the resin composition of the invention which contains the colorant is laminated on a resin sheet, or some other sheet is used.

Examples of the resin of the resin sheet include an acrylic resin; a polyolefin resin and a copolymer thereof, such as polyethylene, polypropylene, polyvinyl chloride, polyvinyl acetate, polyvinyl chloride and acetate, polyvinyl fluoride, or polyvinylidene fluoride resin; a polyester resin such as polyethylene terephthalate; a polycarbonate resin; and a polystyrene resin.

From the viewpoint of recycling, a sheet made of an acrylic resin is the most preferable. Specifically, the resin is preferably polymethyl methacrylate or a copolymer of some other acrylic resin. Examples of the copolymer include ethylene/methyl methacrylate copolymer, ethylene/methyl acrylate copolymer, and ethylene/ethyl acrylate copolymer.

In the invention, examples of the resin sheet include relatively thin sheets which are generally called films or sheets and thick products called plates. A specific thickness thereof is from 10 $\mu$m to 10 mm. In the case of the sheets, the thickness thereof is preferably from about 20 to 100 $\mu$m. In the case of the plates, the thickness is preferably from about 3 to 6 mm. In the case of acrylic plates, the plates are classified into clear plates, which are entirely colorless and transparent, and milky-white plates. Both are preferable.

Thereafter, the resin sheet is shaped. Therefore, the softening point temperature of the resin is preferably from 40 to 200° C., and more preferably from 80 to 150° C.

The extension of the shaping at the time of shaping in the invention is preferably from 101% to 500%. Extension of 100% (that is, being non-drawn) is insignificant. If the extension is 500% or more, the colored film for being shaped breaks and the film cannot resist the extension of the shaping.

The shaping method used in the invention is not particularly limited. Particularly useful is a shaping method which is generally known, for example, insert injection shaping, in-mold shaping, extruding shaping, vacuum/pressuring shaping, blowing (blowing shaping), press shaping, or the like.

Examples of the thus-obtained shaped body include parts (for example, bumpers) used in automobiles, bicycles, motorboats, snow mobiles, domestic electric appliances, electronic devices, and so on.

EXAMPLES

Hereinafter, the present invention will be described in detail by way of the following examples. All parts and % s in the examples represent parts by weight and % s by weight, respectively. The weight average molecular weight of obtained polymers and the like, relative to polystyrene standards, were measured with a gel permeation chromatography device.

Synthesis Examples a-1 to a-20

A four-neck flask provided with a cooling tube, a stirrer, a thermometer, and a nitrogen introducing tube were charged with an unsaturated dibasic acid, another monomer having an ethylenic unsaturated double bond, and a solvent shown in Table 1 on the basis of a blend ratio (weight ratio) shown in Table 1. The mixture was heated to 80° C. while the mixture was stirred under nitrogen atmosphere. Azobisisobutyronitrile in an amount of 70% of a blend proportion shown in Table was added to the mixture and polymerization reaction was conducted for 2 hours. Next, azobisisobutyronitrile in an amount of 15% of the blend proportion (weight proportion) shown in Table 1 was added to the mixture and polymerization reaction was further conducted for 2 hours. In addition, azobisisobutyronitrile in an amount of 15% of the blend proportion (weight proportion) shown in Table 1 was added to the mixture and polymerization reaction was further conducted for 2 hours. In this way, a solution of a copolymer (a) was yielded. The weight average molecular weight (Mw) and the glass transition temperature (Tg) of the resultant copolymer (a) are shown in Table 1.

TABLE 1

| Synthesis | (a1) | (a2) | (a1) | (a3) | | | | | Solvent | | Initiator | | Tg |
|---|---|---|---|---|---|---|---|---|---|---|---|---|---|
| Example | MAH | HEMA | FA | ST | MMA | BMA | HA | HMA | Tol | BuAc | AIBN | Mw/10000 | ° C. |
| a-1 | 5 | | | 5 | 30 | 60 | | | 50 | 50 | 1 | 5.0 | 50 |
| a-2 | 2 | | | 2 | 36 | 60 | | | 50 | 50 | 1 | 5.1 | 50 |
| a-3 | | | 2 | 2 | 36 | 60 | | | 50 | 50 | 1 | 4.8 | 50 |
| a-4 | 2 | | | 2 | 36 | 60 | | | 50 | 50 | 6 | 0.8 | 50 |
| a-5 | 2 | | | 2 | 36 | 60 | | | 50 | 50 | 0.3 | 11 | 50 |
| a-6 | 2 | | | 2 | 96 | | | | 50 | 50 | 1 | 5.2 | 106 |
| a-7 | 2 | | | 2 | | 41 | 55 | | 50 | 50 | 1 | 5.1 | 8 |
| a-8 | 10 | | | 10 | 36 | 44 | | | 50 | 50 | 1 | 4.8 | 65 |
| a-9 | 0.3 | | | 0.3 | 36 | 63.4 | | | 50 | 50 | 1 | 5.3 | 46 |
| a-10 | 5 | 3 | | 5 | 27 | 60 | | | 50 | 50 | 1 | 5.0 | 49 |
| a-11 | 2 | 3 | | 2 | 33 | 60 | | | 50 | 50 | 1 | 5.1 | 49 |
| a-12 | 1.5 | 25 | | 2 | 11 | 60.5 | | | 50 | 50 | 1 | 5.3 | 45 |
| a-13 | 2 | 0.05 | | 2 | 30 | 65.95 | | | 50 | 50 | 1 | 4.7 | 44 |
| a-14 | 2 | 3 | | 2 | 33 | 60 | | | 50 | 50 | 6 | 0.8 | 49 |
| a-15 | 2 | 3 | | 2 | 33 | 60 | | | 50 | 50 | 0.3 | 11 | 49 |

TABLE 1-continued

| Synthesis | (a1) | (a2) | (a1) | (a3) | | | | | Solvent | | Initiator | | Tg |
|---|---|---|---|---|---|---|---|---|---|---|---|---|---|
| Example | MAH | HEMA | FA | ST | MMA | BMA | HA | HMA | Tol | BuAc | AIBN | Mw/10000 | ° C. |
| a-16 | 2 | 3 | | 2 | 93 | | | | 50 | 50 | 1 | 5.2 | 105 |
| a-17 | 2 | 3 | | 2 | | 33 | | 60 | 50 | 50 | 1 | 5.1 | 8 |
| a-18 | 10 | 3 | | 10 | 33 | 44 | | | 50 | 50 | 1 | 4.8 | 63 |
| a-19 | 0.3 | 1 | | 0.3 | 35 | 63.4 | | | 50 | 50 | 1 | 5.3 | 46 |
| a-20 | 2 | | | 2 | 36 | 60 | | | 50 | 50 | 1 | 5.0 | 49 |

MAH: Maleic anhydride
HEMA: 2-Hydroxyethyl methacrylate
FA: Fumaric acid
ST: Styrene
MMA: Methyl methacrylate
BMA: n-Butyl methacrylate
HA: Hexyl acrylate
HMA: Hexyl methacrylate
Tol: Toluene
BuAc: Butyl acetate
AIBN: Azobisisobutyronitrile

Synthesis Examples A1 to A34

After polymerization of the copolymer (a), a compound (b) shown in Table 2 was added to the flask in which the copolymer (a) had been polymerized at a blend ratio (solid content weight ratio) shown in Table 2. The mixture was heated to 80° C. while the mixture was stirred under nitrogen atmosphere. Triethylamine (TEA) was added to the mixture on the basis of a blend proportion shown in Table 2, and the resultant mixture was heated and stirred for 6 hours, so as to yield a solution of a polymer (A). The weight average molecular weight (Mw) and the hydroxyl value (OHV) of the resultant copolymer (A) are shown in Table 2.

TABLE 2

| | Copolymer (a) | | Compound (b) | | Catalyst | | | |
|---|---|---|---|---|---|---|---|---|
| Synthesis Example | Kind | Added amount | Kind | Added amount | Kind | Added amount | Mw/10,000 | OHV |
| A1 | a-1 | 100 | P-3010 | 73 | TEA | 0.5 | 5.6 | 29 |
| A2 | a-1 | 100 | P-4010 | 102 | TEA | 0.5 | 5.9 | 29 |
| A3 | a-2 | 100 | P-3010 | 35 | TEA | 0.5 | 5.3 | 12 |
| A4 | a-2 | 100 | 1900U | 25 | TEA | 0.5 | 5.2 | 12 |
| A5 | a-2 | 100 | PMHC-2050 | 25 | TEA | 0.5 | 5.2 | 12 |
| A6 | a-2 | 100 | G-2000 | 25 | TEA | 0.5 | 5.2 | 12 |
| A7 | a-2 | 100 | P-510 | 20 | TEA | 0.5 | 5.1 | 12 |
| A8 | a-2 | 100 | GK870 | 40 | TEA | 0.5 | 5.3 | 12 |
| A9 | a-2 | 100 | BF-1000 | 25 | TEA | 0.5 | 5.1 | — |
| A10 | a-3 | 100 | P-3010 | 35 | TEA | 0.5 | 5.0 | 12 |
| A11 | a-4 | 100 | P-3010 | 35 | TEA | 0.5 | 0.9 | 12 |
| A12 | a-5 | 100 | P-3010 | 35 | TEA | 0.5 | 11 | 12 |
| A13 | a-6 | 100 | P-3010 | 35 | TEA | 0.5 | 5.3 | 12 |
| A14 | a-7 | 100 | P-3010 | 35 | TEA | 0.5 | 5.2 | 12 |
| A15 | a-8 | 100 | P-3010 | 100 | TEA | 0.5 | 5.0 | 60 |
| A16 | a-9 | 100 | P-3010 | 10 | TEA | 0.5 | 5.3 | 2 |
| A17 | a-10 | 100 | P-3010 | 73 | TEA | 0.5 | 5.6 | 42 |
| A18 | a-10 | 100 | P-4010 | 102 | TEA | 0.5 | 5.9 | 42 |
| A19 | a-11 | 100 | P-3010 | 35 | TEA | 0.5 | 5.3 | 24 |
| A20 | a-11 | 100 | 1900U | 25 | TEA | 0.5 | 5.2 | 24 |
| A21 | a-11 | 100 | PMHC-2050 | 25 | TEA | 0.5 | 5.2 | 24 |
| A22 | a-11 | 100 | G-2000 | 25 | TEA | 0.5 | 5.2 | 24 |
| A23 | a-11 | 100 | P-510 | 20 | TEA | 0.5 | 5.1 | 24 |
| A24 | a-11 | 100 | GK870 | 40 | TEA | 0.5 | 5.3 | 24 |
| A25 | a-11 | 100 | BF-1000 | 25 | TEA | 0.5 | 5.1 | 13 |
| A26 | a-12 | 100 | P-3010 | 35 | TEA | 0.5 | 5.5 | 117 |
| A27 | a-13 | 100 | P-3010 | 35 | TEA | 0.5 | 5.0 | 12 |
| A28 | a-14 | 100 | P-3010 | 35 | TEA | 0.5 | 0.9 | 24 |
| A29 | a-15 | 100 | P-3010 | 35 | TEA | 0.5 | 11 | 24 |
| A30 | a-16 | 100 | P-3010 | 35 | TEA | 0.5 | 5.3 | 24 |
| A31 | a-17 | 100 | P-3010 | 35 | TEA | 0.5 | 5.2 | 24 |
| A32 | a-18 | 100 | P-3010 | 100 | TEA | 0.5 | 5.0 | 70 |

TABLE 2-continued

| | Copolymer (a) | | Compound (b) | | Catalyst | | | |
|---|---|---|---|---|---|---|---|---|
| Synthesis Example | Kind | Added amount | Kind | Added amount | Kind | Added amount | Mw/10,000 | OHV |
| A33 | a-19 | 100 | P-3010 | 10 | TEA | 0.5 | 5.3 | 6 |
| A34 | a-20 | 100 | P-3010 | 35 | TEA | 0.5 | 5.2 | 11 |

P-3010: Polyester polyol ("Kuraray Polyol P-3010", manufactured by Kuraray Co., Ltd., Mw = 3,000)
P-4010: Polyester polyol ("Kuraray Polyol P-4010", manufactured by Kuraray Co., Ltd., Mw = 4,000)
1900U: Polyether polyol ("Desmophen 1900U", manufactured by Sumitomo Bayer Urethane Co., Ltd., Mw = 2,000)
PMHC-2050: Polycarbonate polyol ("Kuraray Polyol PMHC-2050", manufactured by Kuraray Co., Ltd., Mw = 2,000)
G-2000: Polybutadiene polyol ("NISSO-PB G-2000", manufactured by Nippon Soda Co., Ltd., Mw = 2,000)
P-510: Polyester polyol ("Kuraray Polyol P-510", manufactured by Kuraray Co., Ltd., Mw = 500)
GK870: Polyester polyol ("Vylon GK870", manufactured by Toyobo Co., Ltd., Mw = 10,000 to 15,000)
BF-1000: Epoxy-modified polybutadiene ("NISSO-PB BF-1000", manufactured by Nippon Soda Co., Ltd., Mw = 1,000)

Synthesis Example B1

A four-neck flask provided with a cooling tube, a stirrer, a thermometer, a nitrogen introducing tube and a dropping funnel was charged with 100 parts of a polyester having at least two hydroxyl groups ("Kuraray Polyol P-2010", manufactured by Kuraray Co., Ltd.), 22 parts of isophorone diisocyanate, and 122 parts of methyl ethyl ketone. The mixture was heated to 80° C. while the mixture was stirred under nitrogen atmosphere. Thereafter, the mixture was heated and stirred for one hours to yield a prepolymer B1 having isocyanate groups at both terminals thereof and having a weight average molecular weight of 2,500.

Examples 1 to 36 and Comparative Examples 1 to 3

A polymer (A), a compound (B), a compound (C), and an additive were mixed to have a ratio shown in Table 3, based on weights of solid contents. The mixture was diluted with a mixed solvent of toluene and butyl acetate at a weight ratio of 50/50, so that the concentration of solid contents therein was 60%. In this way, a resin composition solution was prepared.

TABLE 3

| | Polymer (A) | | Compound (C) | | Compound (B) | | Additive | |
|---|---|---|---|---|---|---|---|---|
| Example | Kind | Parts by weight | Kind | Parts by weight | Kind | Equivalent ratio | Kind | Parts by weight |
| Example 1 | A1 | 100 | | | Z4470 | 1.0 | | |
| Example 2 | A2 | 100 | | | Z4470 | 1.0 | | |
| Example 3 | A3 | 100 | | | Z4470 | 1.0 | | |
| Example 4 | A3 | 80 | F-3010 | 20 | Z4470 | 1.0 | | |
| Example 5 | A4 | 90 | F-3010 | 10 | Z4470 | 1.0 | | |
| Example 6 | A5 | 60 | F-3010 | 40 | N3300 | 1.0 | | |
| Example 7 | A6 | 75 | F-3010 | 25 | N3300 | 1.0 | | |
| Example 8 | A7 | 55 | F-3010 | 45 | Z4470 | 1.0 | | |
| Example 9 | A8 | 90 | F-3010 | 10 | Z4470 | 1.0 | | |
| Example 10 | A9 | 75 | F-3010 | 25 | N3300 | 1.0 | | |
| Example 11 | A10 | 80 | F-3010 | 20 | Z4470 | 1.0 | | |
| Example 12 | A11 | 80 | F-3010 | 20 | Z4470 | 1.0 | | |
| Example 13 | A12 | 80 | F-3010 | 20 | Z4470 | 1.0 | | |
| Example 14 | A13 | 80 | F-3010 | 20 | Z4470 | 1.0 | | |
| Example 15 | A14 | 80 | F-3010 | 20 | Z4470 | 1.0 | | |
| Example 16 | A15 | 85 | F-3010 | 15 | Z4470 | 1.0 | | |
| Example 17 | A16 | 75 | F-3010 | 25 | Z4470 | 1.0 | | |
| Example 18 | A3/A12 | 60/20 | F-3010 | 20 | Z4470 | 1.0 | | |
| Example 19 | A3 | 80 | P-3010 | 20 | Z4470 | 1.0 | | |
| Example 20 | A3 | 90 | 1900U | 10 | Z4470 | 1.0 | | |
| Example 21 | A3 | 70 | PMHC-2050 | 30 | N3300 | 1.0 | | |
| Example 22 | A3 | 60 | G-2000 | 40 | N3300 | 1.0 | | |
| Example 23 | A3 | 90 | P-510 | 10 | Z4470 | 1.0 | | |
| Example 24 | A3 | 70 | GK870 | 30 | Z4470 | 1.0 | | |
| Example 25 | A3 | 96 | F-3010 | 4 | Z4470 | 1.0 | | |
| Example 26 | A3 | 25 | F-3010 | 75 | Z4470 | 1.0 | | |
| Example 27 | A3 | 80 | F-3010 | 20 | HT | 1.0 | | |
| Example 28 | A3 | 80 | F-3010 | 20 | N3300 | 1.0 | | |
| Example 29 | A3 | 80 | F-3010 | 20 | BL3175 | 1.2 | Catalyst | 0.01 |

TABLE 3-continued

| | Polymer (A) | | Compound (C) | | Compound (B) | | Additive | |
|---|---|---|---|---|---|---|---|---|
| Example | Kind | Parts by weight | Kind | Parts by weight | Kind | Equivalent ratio | Kind | Parts by weight |
| Example 30 | A3 | 80 | F-3010 | 20 | Z4470/B1 | 0.9/0.1 | | |
| Example 31 | A3 | 80 | F-3010 | 20 | Z4470 | 0.4 | | |
| Example 32 | A3 | 80 | F-3010 | 20 | Z4470 | 3.1 | | |
| Example 33 | A3 | 80 | F-3010 | 20 | Z4470 | 1.0 | Resin 1 | 10 |
| Example 34 | A3 | 80 | F-3010 | 20 | Z4470 | 1.0 | Red | 10 |
| Example 35 | A3 | 80 | F-3010 | 20 | Z4470 | 1.0 | Black | 5 |
| Example 36 | A3 | 80 | F-3010 | 20 | Z4470 | 1.0 | White | 60 |
| Comparative Example 1 | | | F-3010 | 100 | Z4470 | 1.0 | | |
| Comparative Example 2 | A3 | 80 | F-3010 | 20 | | | | |
| Comparative Example 3 | | | F-3010 | 20 | Z4470 | 1.0 | Resin 2 | 80 |

Equivalent ratio: The total number of isocyanate groups/the total number of functional groups of the polymer (A) and the compound (B)
F-3010: Polyester polyol ("Kuraray Polyol F-3010", manufactured by Kuraray Co., Ltd., MW = 3,000)
P-3010: Polyester polyol ("Kuraray Polyol P-3010", manufactured by Kuraray Co., Ltd., Mw = 3,000)
1900U: Polyether polyol ("Desmophen 1900U", manufactured by Sumitomo Bayer Urethane Co., Ltd., Mw = 2,000)
PMHC-2050: Polycarbonate polyol ("Kuraray Polyol PMHC-2050", manufactured by Kuraray Co., Ltd., Mw = 2,000)
G-2000: Polybutadiene polyol ("NISSO-PBG-2000", manufactured by Nippon Soda Co., Ltd., MW = 2,000)
P-510: Polyester polyol ("Kuraray Polyol P-510", manufactured by Kuraray Co., Ltd., Mw = 500)
GK870: Polyester polyol ("Vylon GK870", manufactured by Toyobo Co., Ltd., Mw = 10,000 to 15,000)
Z4470: Isocyanurate-modified isophorone diisocyanate ("Desmodur Z4470", manufactured by Sumitomo Bayer Urethane Co., Ltd.)
N3300: Isocyanurate-modified hexamethylene diisocyanate ("Sumidur N3300", manufactured by Sumitomo Bayer Urethane Co., Ltd.)
HT: Trimethylolpropane adduct-modified hexamethylene diisocyanate ("Sumidur HT", manufactured by Sumitomo Bayer Urethane Co., Ltd.)
BL3175: Block-modified hexamethylene diisocyanate ("Desmodur BL3175", manufactured by Sumitomo Bayer Urethane Co., Ltd.)
Catalyst: Ester amine ("Desmorapid PP", manufactured by Sumitomo Bayer Urethane Co., Ltd.)
Resin 1: Acrylic resin ("Acrit 1422TM", manufactured by Taisei Chemical Industries Ltd., Tg = 46° C., Mw = 120,000, OHV = 0)
Resin 2: Acryl polyol resin ("Acrit 6KW-720", manufactured by Taisei Chemical Industries Ltd., Tg = 45° C., Mw = 80,000, OHV = 30)
Red: Red pigment ("CINQUASIA Magenta BRT343D", manufactured by Ciba Specialty Chemicals Co., Ltd.)
Black: Carbon black pigment ("Printex 85", manufactured by Degussa AG)
White: Titanium oxide pigment ("Tipaque CR97", manufactured by Ishihara Sangyo Kaisha Ltd.)

The resultant resin composition was applied onto a peelable sheet ("PET 100X", manufactured by Lintec Corp.) having a thickness of 100 μm by means of a comma coater so that the dry film thickness was about 40 to 80 μm. The resultant was heated in a gas oven at 150° C. for 2 minutes, so as to dry and harden the film. In this way, a sheet made of a hardened body of the resin composition was formed. The dried and hardened film thickness of the sheet is shown in Table 4.

The peelable sheet was removed from the resultant sheet, and the resultant was subjected to various tests. Methods of the tests and evaluating methods are as follows. The test results are shown in Table 4. An evaluation value of 3 or more is at a practical level.

Coatability test: The surface smoothness of the sheet was evaluated with naked eyes, and the stickiness of the surface was evaluated by finger touch sense in accordance with five grades (5: excellent, 4: good, 3: acceptable, 2: bad, and 1: remarkably bad).

Tensile strength test: A test piece having a width of 1 cm and a length of 5 cm was cut off from the sheet, and then set onto a tensile tester ("REO METER NRM-2010J-CW", manufactured by Fudo Manufacturing CO., Ltd.). The test piece was pulled under conditions of a range of 10 kg and a velocity of 30 cm/minute. The tensile strength (break stress×range/sectional area of the sample) was obtained from a maximum load applied until the test piece was broken and the sectional area of the test piece and evaluated in accordance with 5 grades (5: 400 kg/cm$^2$ or more, 4: 300 kg/cm$^2$ or more and less than 400 kg/cm$^2$, 3: 200 kg/cm$^2$ or more and less than 300 kg/cm$^2$, 2: 100 kg/cm$^2$ or more and less than 200 kg/cm$^2$, and 1: less than 100 kg/cm$^2$).

Extensibility test: The test was conducted in the same way as in the tensile strength test, and the maximum extension percentage until the test piece was broken was obtain and was evaluated in accordance with 5 grades (5: 200% or more, 4: 150% or more and less than 200%, 3: 100% or more and less than 150%, 2: 50% or more and less than 100%, and 1: less than 50% under the condition that the ratio before the piece was extended is 0%).

Tear strength test: A test piece was punched out from the sheet by means of a JIS K6301 tearing B model, and set onto the tensile tester ("REO METER NRM-2010J-CW", manufactured by Fudo Manufacturing CO., Ltd.). The test piece was pulled under conditions of a range of 10 kg and a velocity of 30 cm/minute. The tear strength (break stress×range) was obtained from a maximum load applied when the test piece was torn and was evaluated in accordance with 5 grades (5: 400 kg/cm$^2$ or more, 4: 300 kg/cm$^2$ or more and less than 400 kg/cm$^2$, 3: 200 kg/cm$^2$ or more and less than 300 kg/cm$^2$, 2: 100 kg/cm$^2$ or more and less than 200 kg/cm$^2$, and 1: less than 100 kg/cm$^2$).

Shaping-workability test 1: By an Erichsen test A method based on JIS Z2247, change in the external appearance of the sheet when a steel sphere punch was pushed against the sheet by 10 mm was evaluated with naked eyes in accordance with 5 grades (5: not changed, 4: slightly changed, 3: changed, 2: deteriorated, and 1: remarkably deteriorated).

Shaping-workability test 2: A cutting tester ("CM24", manufactured by Roland Corp.) was used to cut the sheet into various pattern shapes. The precision of the cutting was evaluated with naked eyes in accordance with 5 grades (5: excellent, 4: good, 3: acceptable, 2: bad, and 1: remarkably bad).

Accelerated weather resistance test: An ultraviolet ray carbon arc lamp type weather resistance tester (manufactured by Suga Test Instruments Co., Ltd.) prescribed according to JIS B7750 was used to conduct a test based on JIS K5400 6.17. Change in the external appearance of the sheet after 1000 hours lapsed was evaluated with naked eyes in accordance with 5 grades (5: not changed, 4: slightly changed, 3: changed, 2: deteriorated, and 1: remarkably deteriorated).

Chemical resistance test: The sheet was immersed into each of the following chemicals under the following conditions. Thereafter, change in the external appearance of the sheet was evaluated with naked eyes in accordance with 5 grades (5: not change, 4: slightly changed, 3: changed, 2: deteriorated, and 1: remarkably deteriorated).

| No. | Chemical | Conditions |
|---|---|---|
| 1 | Boiled water | Immerse in 98° boiled water for 5 minutes |
| 2 | Isopropyl alcohol | Immerse in a standard state for 1 hour |
| 3 | Xylene | Immerse in a standard state for 1 hour |
| 4 | Gasoline | Immerse in a standard state for 1 hour |
| 5 | 5% Saline | Immerse in a standard state for 240 hour |
| 6 | 5% Sulfuric acid aqueous solution | Immerse in a standard state for 7 hour |
| 7 | 5% Sodium hydroxide aqueous solution | Immerse in a standard state for 7 hour |

Example 37

An adhesive solution (two-component acrylic adhesive/hardening agent=100/8.7) was applied onto a peelable sheet ("TSM-110K", manufactured by Kaito Chemical Industry Co., Ltd.) having a film thickness of 100 $\mu$m by means of a comma coater so that the dry film thickness of the adhesive was about 10 to 20 $\mu$m. The resultant was heated, dried and hardened in a gas oven at 80° C. for 2 minutes, so as to form an adhesive agent sheet. The formed adhesive agent sheet and the sheet formed in Example 2 were laminated and adhered to each other in such a manner that the adhesive agent-applied surface and the surface of the hardened body of the resin composition were adhered to each other. Thus, an adhesive sheet was formed. The resultant adhesive sheet was subjected to the same tests as in Example 1. The test results are shown in Table 4.

Example 38

An adhesive agent sheet formed in the same way as in Example 37 and the sheet formed in Example 4 were laminated and adhered to each other in such a manner that the adhesive agent-applied surface and the surface of the hardened body of the resin composition were adhered to each other. Thus, an adhesive sheet was formed. The resultant adhesive sheet was subjected to the same tests as in Example 1. The test results are shown in Table 4.

Comparative Example 4

A printing ink ("New Ramipack Super R180 Red", manufactured by Toyo Ink Mfg. Co., Ltd.) for plastic films was used to form a sheet in the same way as in Example 1. The resultant sheet was subjected to the same tests as in Example 1. The test results are shown in Table 4.

Comparative Examples 5 to 7

A soft polyvinyl chloride sheet having a film thickness of 80 $\mu$m (Comparative Example 5), a polyethylene terephthalate sheet having a film thickness of 80 $\mu$m (Comparative Example 6), and a polypropylene sheet having a film thickness of 80 $\mu$m (Comparative Example 7) were subjected to the same tests as in Example 1. The test results are shown in Table 4.

TABLE 4

| Example | Film thickness $\mu$m | Cotability | Tensile strength | Extensibility | Tear strength | Shaping-workability 1 | Shaping-workability 2 | Weather resistance | Chemical resistance 1 | 2 | 3 | 4 | 5 | 6 | 7 |
|---|---|---|---|---|---|---|---|---|---|---|---|---|---|---|---|
| Example 1 | 52 | 5 | 5 | 4 | 4 | 4 | 4 | 4 | 5 | 5 | 5 | 5 | 5 | 5 | 5 |
| Example 2 | 51 | 5 | 5 | 5 | 4 | 5 | 4 | 4 | 5 | 5 | 5 | 5 | 5 | 5 | 5 |
| Example 3 | 51 | 5 | 4 | 3 | 3 | 3 | 3 | 4 | 5 | 5 | 5 | 5 | 5 | 5 | 5 |
| Example 4 | 52 | 5 | 5 | 5 | 5 | 5 | 5 | 5 | 5 | 5 | 5 | 5 | 5 | 5 | 5 |
| Example 5 | 53 | 5 | 5 | 5 | 4 | 5 | 5 | 5 | 5 | 5 | 5 | 5 | 5 | 5 | 5 |
| Example 6 | 52 | 5 | 5 | 5 | 5 | 5 | 4 | 5 | 5 | 5 | 5 | 5 | 5 | 5 | 5 |
| Example 7 | 52 | 5 | 5 | 5 | 5 | 5 | 4 | 5 | 5 | 5 | 5 | 5 | 5 | 5 | 5 |
| Example 8 | 51 | 5 | 5 | 4 | 5 | 5 | 4 | 5 | 5 | 5 | 5 | 5 | 5 | 5 | 5 |
| Example 9 | 51 | 4 | 5 | 5 | 5 | 5 | 4 | 4 | 5 | 5 | 4 | 4 | 5 | 5 | 5 |
| Example 10 | 50 | 5 | 5 | 5 | 5 | 4 | 4 | 5 | 5 | 5 | 5 | 5 | 5 | 5 | 5 |
| Example 11 | 51 | 5 | 5 | 5 | 5 | 5 | 5 | 5 | 5 | 5 | 5 | 5 | 5 | 5 | 5 |
| Example 12 | 51 | 5 | 4 | 5 | 4 | 5 | 5 | 4 | 5 | 5 | 4 | 4 | 5 | 5 | 5 |
| Example 13 | 52 | 5 | 5 | 4 | 4 | 5 | 4 | 5 | 5 | 5 | 5 | 5 | 5 | 5 | 5 |

TABLE 4-continued

| Example | Film thickness µm | Cotability | Tensile strength | Extensibility | Tear strength | Shaping-workability 1 | Shaping-workability 2 | Weather resistance | Chemical resistance 1 | 2 | 3 | 4 | 5 | 6 | 7 |
|---|---|---|---|---|---|---|---|---|---|---|---|---|---|---|---|
| Example 14 | 54 | 5 | 5 | 4 | 5 | 4 | 4 | 5 | 5 | 5 | 5 | 5 | 5 | 5 | 5 |
| Example 15 | 55 | 5 | 5 | 5 | 5 | 5 | 4 | 4 | 5 | 4 | 4 | 4 | 5 | 5 | 5 |
| Example 16 | 55 | 4 | 5 | 5 | 5 | 5 | 5 | 4 | 5 | 5 | 5 | 5 | 5 | 5 | 5 |
| Example 17 | 52 | 5 | 4 | 4 | 5 | 5 | 5 | 5 | 5 | 5 | 5 | 5 | 5 | 5 | 5 |
| Example 18 | 50 | 5 | 5 | 5 | 5 | 5 | 5 | 5 | 5 | 5 | 5 | 5 | 5 | 5 | 5 |
| Example 19 | 52 | 5 | 5 | 5 | 4 | 5 | 5 | 5 | 5 | 5 | 5 | 5 | 5 | 5 | 5 |
| Example 20 | 50 | 5 | 5 | 5 | 4 | 5 | 5 | 5 | 5 | 5 | 5 | 5 | 5 | 5 | 5 |
| Example 21 | 52 | 5 | 5 | 5 | 5 | 5 | 4 | 5 | 5 | 5 | 5 | 5 | 5 | 5 | 5 |
| Example 22 | 52 | 5 | 5 | 5 | 5 | 5 | 4 | 5 | 5 | 5 | 5 | 5 | 5 | 5 | 5 |
| Example 23 | 53 | 5 | 4 | 4 | 4 | 5 | 5 | 5 | 5 | 5 | 5 | 5 | 5 | 5 | 5 |
| Example 24 | 52 | 4 | 5 | 5 | 5 | 5 | 5 | 5 | 5 | 5 | 4 | 4 | 5 | 5 | 5 |
| Example 25 | 54 | 5 | 5 | 4 | 5 | 5 | 5 | 5 | 5 | 5 | 5 | 5 | 5 | 5 | 5 |
| Example 26 | 53 | 4 | 4 | 5 | 4 | 5 | 5 | 4 | 5 | 4 | 4 | 4 | 5 | 5 | 5 |
| Example 27 | 53 | 5 | 4 | 5 | 5 | 5 | 5 | 5 | 5 | 5 | 5 | 5 | 5 | 5 | 5 |
| Example 28 | 51 | 5 | 4 | 5 | 5 | 5 | 5 | 5 | 5 | 5 | 5 | 5 | 5 | 5 | 5 |
| Example 29 | 52 | 5 | 4 | 5 | 5 | 5 | 5 | 5 | 5 | 5 | 5 | 5 | 5 | 5 | 5 |
| Example 30 | 56 | 5 | 5 | 5 | 5 | 5 | 5 | 5 | 5 | 5 | 5 | 5 | 5 | 5 | 5 |
| Example 31 | 55 | 5 | 5 | 5 | 4 | 5 | 5 | 4 | 5 | 5 | 4 | 4 | 5 | 5 | 5 |
| Example 32 | 54 | 5 | 4 | 5 | 5 | 5 | 5 | 4 | 5 | 5 | 5 | 5 | 5 | 5 | 5 |
| Example 33 | 52 | 4 | 5 | 4 | 4 | 5 | 4 | 5 | 5 | 5 | 5 | 5 | 5 | 5 | 5 |
| Example 34 | 53 | 5 | 5 | 5 | 5 | 5 | 5 | 5 | 5 | 5 | 5 | 5 | 5 | 5 | 5 |
| Example 35 | 52 | 5 | 5 | 5 | 5 | 5 | 5 | 5 | 5 | 5 | 5 | 5 | 5 | 5 | 5 |
| Example 36 | 52 | 5 | 5 | 5 | 5 | 5 | 5 | 5 | 5 | 5 | 5 | 5 | 5 | 5 | 5 |
| Example 37 | 70 | 5 | 5 | 5 | 4 | 5 | 4 | 4 | 5 | 5 | 5 | 5 | 5 | 5 | 5 |
| Example 38 | 70 | 5 | 5 | 5 | 5 | 5 | 5 | 5 | 5 | 5 | 5 | 5 | 5 | 5 | 5 |
| Comparative Example 1 | 51 | 1 | 1 | 1 | 1 | 1 | 1 | 1 | 4 | 1 | 1 | 1 | 4 | 1 | 1 |
| Comparative Example 2 | 50 | 5 | 2 | 2 | 2 | 3 | 2 | 2 | 4 | 4 | 2 | 2 | 4 | 4 | 4 |
| Comparative Example 3 | 56 | 5 | 5 | 2 | 1 | 4 | 2 | 4 | 5 | 5 | 5 | 5 | 5 | 5 | 5 |
| Comparative Example 4 | 50 | 5 | 1 | 3 | 1 | 5 | 1 | 1 | 5 | 2 | 1 | 1 | 4 | 4 | 4 |
| Comparative Example 5 | 80 | — | 5 | 5 | 5 | 5 | 4 | 3 | 5 | 4 | 2 | 2 | 5 | 5 | 5 |
| Comparative Example 6 | 80 | — | 4 | 1 | 2 | 1 | 1 | 1 | 5 | 5 | 5 | 5 | 5 | 5 | 5 |
| Comparative Example 7 | 80 | — | 5 | 5 | 5 | 5 | 2 | 2 | 5 | 3 | 1 | 1 | 5 | 4 | 4 |

Examples 39 to 70 and Comparative Examples 8 to 10

A polymer (A), a compound (B), a compound (C) and an additive shown in Table 5 were mixed with each other to have a ratio, on the basis of the weight of solid contents, shown in Table 5, and then a resin composition solution was prepared in the same way as in Example 1.

TABLE 5

| | Polymer (A) | | Compound (C) | | Compound (B) | | Additive | |
|---|---|---|---|---|---|---|---|---|
| Example | Kind | Parts by weight | Kind | Parts by weight | Kind | Equivalent ratio | Kind | Parts by weight |
| Example 39 | A17 | 100 | | | Z4470 | 1.0 | | |
| Example 40 | A18 | 100 | | | Z4470 | 1.0 | | |
| Example 41 | A19 | 100 | | | Z4470 | 1.0 | | |
| Example 42 | A19 | 80 | F-3010 | 20 | Z4470 | 1.0 | | |
| Example 43 | A20 | 90 | 1900U | 10 | Z4470 | 1.0 | | |
| Example 44 | A21 | 70 | PMHC-2050 | 30 | N3300 | 1.0 | | |
| Example 45 | A22 | 75 | G-2000 | 25 | N3300 | 1.0 | | |
| Example 46 | A23 | 90 | P-510 | 10 | Z4470 | 1.0 | | |
| Example 47 | v24 | 90 | GK840 | 10 | Z4470 | 1.0 | | |
| Example 48 | A25 | 75 | F-3010 | 25 | HT | 1.0 | | |
| Example 49 | A26 | 80 | F-3010 | 20 | Z4470 | 1.0 | | |
| Example 50 | A27 | 80 | F-3010 | 20 | Z4470 | 1.0 | | |
| Example 51 | A28 | 80 | F-3010 | 20 | Z4470 | 1.0 | | |
| Example 52 | A29 | 80 | F-3010 | 20 | Z4470 | 1.0 | | |
| Example 53 | A30 | 80 | F-3010 | 20 | Z4470 | 1.0 | | |
| Example 54 | A31 | 80 | F-3010 | 20 | Z4470 | 1.0 | | |
| Example 55 | A32 | 85 | F-3010 | 15 | Z4470 | 1.0 | | |
| Example 56 | A33 | 75 | F-3010 | 25 | Z4470 | 1.0 | | |

TABLE 5-continued

| | Polymer (A) | | Compound (C) | | Compound (B) | | Additive | |
|---|---|---|---|---|---|---|---|---|
| Example | Kind | Parts by weight | Kind | Parts by weight | Kind | Equivalent ratio | Kind | Parts by weight |
| Example 57 | A19/A29 | 60/20 | F-3010 | 20 | Z4470 | 1.0 | | |
| Example 58 | A19 | 80 | P-3010 | 20 | Z4470 | 1.0 | | |
| Example 59 | A19 | 96 | F-3010 | 4 | Z4470 | 1.0 | | |
| Example 60 | A19 | 25 | F-3010 | 75 | Z4470 | 1.0 | | |
| Example 61 | A19 | 80 | F-3010 | 20 | BL3175 | 1.2 | Catalyst | 0.01 |
| Example 62 | A19 | 80 | F-3010 | 20 | Z4470/B1 | 0.9/0.1 | | |
| Example 63 | A19 | 80 | F-3010 | 20 | Z4470 | 0.4 | | |
| Example 64 | A19 | 80 | F-3010 | 20 | Z4470 | 3.1 | | |
| Example 65 | A19 | 80 | F-3010 | 20 | Z4470 | 1.0 | Resin 1 | 10 |
| Example 66 | A19 | 80 | F-3010 | 20 | Z4470 | 1.0 | Red | 10 |
| Example 67 | A19 | 80 | F-3010 | 20 | Z4470 | 1.0 | Black | 5 |
| Example 68 | A19 | 80 | F-3010 | 20 | Z4470 | 1.0 | White | 60 |
| Example 69 | A3 | 80 | F-3010 | 20 | Z4470 | 1.0 | | |
| Example 70 | A34 | | F-3010 | 20 | Z4470 | 1.0 | | |
| Comparative Example 8 | | | F-3010 | 100 | Z4470 | 1.0 | | |
| Comparative Example 9 | A19 | 80 | F-3010 | 20 | | | | |
| Comparative Example 10 | | | F-3010 | 20 | Z4470 | 1.0 | Resin 2 | 80 |

The resultant resin composition was used to produce a sheet made of a hardened body of the resin composition in the same way as in Example 1. The dried and hardened film thickness of the sheet is shown in Table 6.

The peelable sheet was removed from the resultant sheet, and the resultant was subjected to various tests. Methods of the tests and evaluating methods are as follows. The test results are shown in Table 6. An evaluation value of 3 or more is at a practical level.

Coatability test: The surface smoothness of the sheet was evaluated with naked eyes, and the stickiness of the surface was evaluated by finger touch sense in accordance with five grades (5: excellent, 4: good, 3: acceptable, 2: bad, and 1: remarkably bad).

Tensile strength test: A test piece having a width of 1 cm and a length of 5 cm was cut off from the sheet, and then set onto a tensile tester ("REO METER NRM-2010J-CW", manufactured by Fudo Kogyo Co., Ltd.). The test piece was pulled under conditions of a range of 10 kg and a velocity of 30 cm/minute. The tensile strength (break stress×range/sectional area of the sample) was obtained from a maximum load applied until the test piece was broken and the sectional area of the test piece and evaluated in accordance with 5 grades (5: 500 kg/cm$^2$ or more, 4: 400 kg/cm$^2$ or more and less than 500 kg/cm$^2$, 3: 300 kg/cm$^2$ or more and less than 400 kg/cm$^2$, 2: 200 kg/cm$^2$ or more and less than 300 kg/cm$^2$, and 1: less than 200 kg/cm$^2$).

Extensibility test: The test was conducted in the same way as in the tensile strength test, and the maximum extension percentage until the test piece was broken was obtained and evaluated in accordance with 5 grades (5: 250% or more, 4: 200% or more and less than 250%, 3: 150% or more and less than 200%, 2:100% or more and less than 150%, and 1: less than 100% under the condition that the ratio before the piece was extended is 0%).

Tear strength test: A test piece was punched out from the sheet by means of a JIS K6301 tearing B model, and set onto the tensile tester ("REO METER NRM-2010J-CW", manufactured by Fudo Kogyo Co., Ltd.). The test piece was pulled under conditions of a range of 10 kg and a velocity of 30 cm/minute. The tear strength (break stress×range) was obtained from a maximum load applied when the test piece was torn and evaluated in accordance with 5 grades (5: 500 kg/cm$^2$ or more, 4: 400 kg/cm$^2$ or more and less than 300 kg/cm$^2$, 3: 300 kg/cm$^2$ or more and less than 400 kg/cm$^2$, 2: 200 kg/cm$^2$ or more and less than 300 kg/cm$^2$, and 1: less than 200 kg/cm$^2$).

Shaping-workability test 1: By an Erichsen test A method based on JIS Z2247, change in the external appearance of the sheet when a steel sphere punch was pushed against the sheet by 15 mm was evaluated with naked eyes in accordance with 5 grades (5: not changed, 4: slightly changed, 3: changed, 2: deteriorated, and 1: remarkably deteriorated).

Shaping-workability test 2: A cutting tester ("CM24", manufactured by Roland Corp.) was used to cut the sheet into various pattern shapes. The precision of the cutting was evaluated with naked eyes in accordance with 5 grades (5: excellent, 4: good, 3: acceptable, 2: bad, and 1: remarkably bad).

Accelerated weather resistance test: An ultraviolet ray carbon arc lamp type weather resistance tester (manufactured by Suga Test Instruments Co., Ltd.) prescribed according to JIS B7750 was used to conduct a test based on JIS K5400 6.17. Change in the external appearance of the sheet after 2000 hours lapsed was evaluated with naked eyes in accordance with 5 grades (5: not changed, 4: slightly changed, 3: changed, 2: deteriorated, and 1: remarkably deteriorated).

Chemical resistance test: The sheet was immersed into each of the following chemicals under the following conditions. Thereafter, change in the external appearance of the sheet was evaluated with naked eyes in accordance with 5 grades (5: not changed, 4: slightly changed, 3: changed, 2: deteriorated, and 1: remarkably deteriorated).

| No. | Chemical | Conditions |
|---|---|---|
| 1 | Boiled water | Immerse in 98° boiled water for 60 minutes |
| 2 | Isopropyl alcohol | Immerse in a standard state for 2 hour |
| 3 | Xylene | Immerse in a standard state for 2 hour |

-continued

| No. | Chemical | Conditions |
|---|---|---|
| 4 | Gasoline | Immerse in a standard state for 2 hour |
| 5 | 5% Saline | Immerse in a standard state for 300 hour |
| 6 | 5% Sulfuric acid aqueous solution | Immerse in a standard state for 12 hour |
| 7 | 5% Sodium hydroxide aqueous solution | Immerse in a standard state for 12 hour |

Example 71

An adhesive agent sheet formed in the same way as in Example 37 and the sheet formed in Example 39 were laminated and adhered to each other in such a manner that the adhesive agent-applied surface and the surface of the hardened body of the resin composition were adhered to each other. Thus, an adhesive sheet was formed. The resultant adhesive sheet was subjected to the same tests as in Example 39. The test results are shown in Table 6.

Example 72

An adhesive agent sheet formed in the same way as in Example 37 and the sheet formed in Example 40 were laminated and adhered to each other in such a manner that the adhesive agent-applied surface and the surface of the hardened body of the resin composition were adhered to each other. Thus, an adhesive sheet was formed. The resultant adhesive sheet was subjected to the same tests as in Example 39. The test results are shown in Table 6.

Example 73

An adhesive agent sheet formed in the same way as in Example 37 and the sheet formed in Example 42 were laminated and adhered to each other in such a manner that the adhesive agent-applied surface and the surface of the hardened body of the resin composition were adhered to each other. Thus, an adhesive sheet was formed. The resultant adhesive sheet was subjected to the same tests as in Example 39. The test results are shown in Table 6.

Comparative Examples 11 to 13

A soft polyvinyl chloride sheet having a film thickness of 80 μm (Comparative Example 11), a polyethylene terephthalate sheet having a film thickness of 80 μm (Comparative Example 12), and a polypropylene sheet having a film thickness of 80 μm (Comparative Example 13) were subjected to the same tests as in Example 39. The test results are shown in Table 6.

TABLE 6

| | Film thickness | | Tensile | | Tear | Shaping-workability | | Weather | Chemical resistance | | | | | | |
|---|---|---|---|---|---|---|---|---|---|---|---|---|---|---|---|
| Example | μm | Cotability | strength | Extensibility | strength | 1 | 2 | resistance | 1 | 2 | 3 | 4 | 5 | 6 | 7 |
| Example 39 | 55 | 5 | 4 | 4 | 4 | 4 | 4 | 5 | 5 | 5 | 5 | 5 | 5 | 5 | 5 |
| Example 40 | 56 | 5 | 5 | 5 | 4 | 5 | 4 | 5 | 5 | 5 | 5 | 5 | 5 | 5 | 5 |
| Example 41 | 54 | 5 | 4 | 3 | 4 | 4 | 3 | 5 | 5 | 5 | 5 | 5 | 5 | 5 | 5 |
| Example 42 | 55 | 5 | 5 | 5 | 5 | 5 | 5 | 5 | 5 | 5 | 5 | 5 | 5 | 5 | 5 |
| Example 43 | 54 | 5 | 4 | 5 | 4 | 5 | 4 | 4 | 5 | 5 | 5 | 5 | 5 | 5 | 5 |
| Example 44 | 55 | 5 | 5 | 4 | 4 | 5 | 5 | 5 | 5 | 5 | 5 | 5 | 5 | 5 | 5 |
| Example 45 | 55 | 5 | 5 | 5 | 5 | 5 | 4 | 4 | 5 | 5 | 5 | 5 | 5 | 5 | 5 |
| Example 46 | 57 | 5 | 4 | 3 | 4 | 5 | 4 | 5 | 5 | 4 | 3 | 5 | 5 | 5 | 5 |
| Example 47 | 55 | 4 | 3 | 5 | 4 | 5 | 4 | 4 | 5 | 4 | 3 | 5 | 5 | 5 | 5 |
| Example 48 | 54 | 5 | 4 | 4 | 4 | 4 | 3 | 4 | 5 | 5 | 5 | 5 | 5 | 5 | 5 |
| Example 49 | 54 | 5 | 5 | 4 | 5 | 4 | 4 | 5 | 5 | 5 | 5 | 5 | 5 | 5 | 5 |
| Example 50 | 56 | 5 | 4 | 5 | 4 | 5 | 4 | 4 | 5 | 5 | 5 | 5 | 5 | 5 | 5 |
| Example 51 | 57 | 4 | 3 | 5 | 4 | 5 | 4 | 4 | 5 | 4 | 4 | 4 | 5 | 5 | 5 |
| Example 52 | 55 | 4 | 4 | 3 | 4 | 5 | 4 | 5 | 5 | 5 | 5 | 5 | 5 | 5 | 5 |
| Example 53 | 56 | 4 | 5 | 3 | 4 | 4 | 4 | 5 | 5 | 5 | 5 | 5 | 5 | 5 | 5 |
| Example 54 | 55 | 5 | 3 | 5 | 4 | 5 | 4 | 4 | 5 | 5 | 4 | 5 | 5 | 5 | 5 |
| Example 55 | 56 | 4 | 4 | 5 | 4 | 5 | 4 | 4 | 5 | 5 | 4 | 5 | 5 | 5 | 5 |
| Example 56 | 56 | 5 | 4 | 4 | 4 | 5 | 4 | 5 | 5 | 5 | 4 | 5 | 5 | 5 | 5 |
| Example 57 | 55 | 5 | 4 | 5 | 5 | 5 | 4 | 5 | 5 | 5 | 5 | 5 | 5 | 5 | 5 |
| Example 58 | 54 | 4 | 4 | 3 | 3 | 5 | 3 | 4 | 5 | 5 | 4 | 5 | 5 | 5 | 5 |
| Example 59 | 57 | 5 | 5 | 4 | 4 | 5 | 4 | 5 | 5 | 5 | 5 | 5 | 5 | 5 | 5 |
| Example 60 | 52 | 3 | 3 | 5 | 4 | 5 | 3 | 3 | 5 | 3 | 3 | 5 | 5 | 5 | 5 |
| Example 61 | 55 | 5 | 5 | 5 | 5 | 5 | 5 | 5 | 5 | 5 | 5 | 5 | 5 | 5 | 5 |
| Example 62 | 54 | 5 | 5 | 5 | 5 | 5 | 5 | 5 | 5 | 5 | 5 | 5 | 5 | 5 | 5 |
| Example 63 | 54 | 5 | 4 | 5 | 4 | 5 | 4 | 4 | 5 | 4 | 3 | 5 | 5 | 5 | 5 |
| Example 64 | 54 | 4 | 5 | 4 | 4 | 4 | 4 | 4 | 5 | 5 | 5 | 5 | 5 | 5 | 5 |
| Example 65 | 57 | 4 | 4 | 3 | 3 | 5 | 3 | 5 | 5 | 4 | 3 | 5 | 5 | 5 | 5 |
| Example 66 | 55 | 5 | 5 | 5 | 5 | 5 | 5 | 5 | 5 | 5 | 5 | 5 | 5 | 5 | 5 |
| Example 67 | 55 | 5 | 5 | 5 | 5 | 5 | 5 | 5 | 5 | 5 | 5 | 5 | 5 | 5 | 5 |
| Example 68 | 55 | 5 | 5 | 5 | 5 | 5 | 5 | 5 | 5 | 5 | 5 | 5 | 5 | 5 | 5 |
| Example 69 | 55 | 5 | 4 | 5 | 4 | 5 | 4 | 4 | 5 | 4 | 3 | 3 | 5 | 5 | 5 |
| Example 70 | 55 | 5 | 4 | 5 | 4 | 5 | 4 | 3 | 5 | 3 | 2 | 2 | 5 | 5 | 5 |
| Example 71 | 71 | 5 | 4 | 4 | 4 | 4 | 4 | 4 | 5 | 5 | 5 | 5 | 5 | 5 | 5 |
| Example 72 | 70 | 5 | 5 | 5 | 4 | 5 | 4 | 5 | 5 | 5 | 5 | 5 | 5 | 5 | 5 |
| Example 73 | 70 | 5 | 5 | 5 | 5 | 5 | 5 | 5 | 5 | 5 | 5 | 5 | 5 | 5 | 5 |
| Comparative Example 8 | 56 | 1 | 1 | 1 | 1 | 1 | 1 | 1 | 4 | 1 | 1 | 1 | 4 | 1 | 1 |
| Comparative Example 9 | 54 | 5 | 2 | 2 | 2 | 3 | 2 | 4 | 4 | 4 | 2 | 2 | 4 | 4 | 4 |

TABLE 6-continued

| Example | Film thickness μm | Cotability | Tensile strength | Extensibility | Tear strength | Shaping-workability 1 | Shaping-workability 2 | Weather resistance | Chemical resistance 1 | 2 | 3 | 4 | 5 | 6 | 7 |
|---|---|---|---|---|---|---|---|---|---|---|---|---|---|---|---|
| Comparative Example 10 | 56 | 5 | 5 | 2 | 2 | 4 | 2 | 4 | 5 | 5 | 5 | 5 | 5 | 5 | 5 |
| Comparative Example 11 | 80 | — | 5 | 5 | 5 | 5 | 4 | 2 | 5 | 4 | 2 | 2 | 5 | 5 | 5 |
| Comparative Example 12 | 80 | — | 3 | 1 | 2 | 1 | 1 | 1 | 5 | 5 | 5 | 5 | 5 | 5 | 5 |
| Comparative Example 13 | 80 | — | 5 | 5 | 5 | 5 | 1 | 2 | 5 | 3 | 1 | 1 | 5 | 4 | 4 |

The invention claimed is:

1. A resin composition comprising: a vinyl polymer (A) having, at a side chain thereof, at least one structure selected from polyester, polycarbonate or polybutadiene which has a functional group that can react with an isocyanate group; and a polyisocyanate compound (B) having at least two isocyanate groups, wherein the polymer (A) is a graft polymer obtained by a condensation reaction between a copolymer (a) of an unsaturated dibasic acid and another monomer having an ethylenic unsaturated double bond, and at least one (b) selected from polyester, polycarbonate, or polybutadiene, which has a functional group that can react with a carboxyl group and a functional group that can react with an isocyanate group.

2. A resin composition comprising: a vinyl polymer (A) having, at a side chain thereof, at least one structure selected from polyester, polycarbonate or polybutadiene which has a functional group that can react with an isocyanate group; a polyisocyanate compound (B) having at least two isocyanate groups; and at least one (C) selected from polyester, polycarbonate or polybutadiene which has at least two functional groups that can react with isocyanate groups, wherein the polymer (A) is a graft polymer obtained by a condensation reaction between a copolymer (a) of an unsaturated dibasic acid and another monomer having an ethylenic unsaturated double bond, and at least one (b) selected from polyester, polycarbonate, or polybutadiene, whrch has a functional group that can react with a carboxyl group and a functional group that can react with an isocyanate group.

3. The resin composition of claim 1, wherein the polymer (A) is a graft polymer obtained by a condensation reaction between a copolymer (a) of an unsaturated dibasic acid (a1), a monomer (a2), which is a monomer other than the unsaturated dibasic acid (a1) and has a functional group that can react with an isocyanate and an ethylenic unsaturated double bond, and a monomer (a3), which is a monomer other than the unsaturated dibasic acid (a1) and the monomer (a2) and has an ethylenic unsaturated double bond, and at least one (b) selected from polyester, polycarbonate or polybutadiene, which has a functional group that can react with a carboxyl group and a functional group that can react with an isocyanate group.

4. The resin composition of claim 2, wherein the polymer (A) is a graft polymer obtained by a condensation reaction between a copolymer (a) of an unsaturated dibasic acid (a1), a monomer (a2), which is a monomer other than the unsaturated dibasic acid (a1) and has a functional group that can react with an isocyanate and an ethylenic unsaturated double bond, and a monomer (a3), which is a monomer other than the unsaturated dibasic acid (a1) and the monomer (a2) and has an ethylenic unsaturated double bond, and at least one (b) selected from polyester, polycarbonate or polybutadiene, which has a functional group that can react with a carboxyl group and a functional group that can react with an isocyanate group.

5. The resin composition of claim 2 further comprising a colorant.

6. The resin composition of claim 3 further comprising a colorant.

7. A sheet made of a hardened body of the resin composition according to claim 2.

8. A sheet made of a hardened body of the resin composition according to claim 3.

9. The sheet of claim 7 comprising, on one of a single surface or both surfaces thereof an adhesive layer.

10. The sheet of claim 8 comprising, on one of a single surface or both surfaces thereof, an adhesive layer.

11. A process for producing a sheet, comprising the steps of: applying the resin composition according to claim 2 onto a peelable sheet; and hardening the resultant layer.

12. A process for producing a sheet, comprising the steps of: applying the resin composition according to claim 3 onto a peelable sheet; and hardening the resultant layer.

13. A shaped body formed by shaping the sheet according to claim 7.

14. A shaped body formed by shaping the sheet according to claim 8.

* * * * *

UNITED STATES PATENT AND TRADEMARK OFFICE

CERTIFICATE OF CORRECTION

PATENT NO. : 6,998,439 B2
APPLICATION NO. : 10/470401
DATED : February 14, 2006
INVENTOR(S) : Miki Shikano et al.

It is certified that error appears in the above-identified patent and that said Letters Patent is hereby corrected as shown below:

At column 5, line 8, please delete "a(meth)acrylic" and insert -- a (meth)acrylic --, therefor.

At column 5, line 10, please delete "a(meth)acrylic" and insert -- a (meth)acrylic --, therefor.

At column 6, line 1, please delete "a(meth)acrylic" and insert -- a (meth)acrylic --, therefor.

At column 7, line 67, please delete "groups." and insert -- groups --, therefor.

At column 8, line 19, please delete "α, β" and insert -- α, ω --, therefor.

At column 8, lines 30-31, please delete "NISSO-PBBF-1000," and insert -- NISSO-PB BF-1000, --, therefor.

At column 9, line 18, please delete "pigment dispersibility" and insert -- pigment-dispersibility --, therefor.

At column 9, line 36, please delete "shaping working" and insert --shaping-working--, therefor.

At column 10, line 52, please delete "maybe" and insert -- may be --, therefor.

At column 12, line 5, after "esters of" please insert - -β- - -, therefor.

At column 14, line 20, please delete "maybe" and insert - - may be - -, therefor.

At column 14, line 21, please delete "maybe" and insert - - may be - -, therefor.

At column 21, line 3 (Below Table), please delete "MW" and insert - - Mw - -, therefor.

At column 21, line 4 (Below Table), please delete "MW" and insert - - Mw - -, therefor.

UNITED STATES PATENT AND TRADEMARK OFFICE

CERTIFICATE OF CORRECTION

PATENT NO. : 6,998,439 B2
APPLICATION NO. : 10/470401
DATED : February 14, 2006
INVENTOR(S) : Miki Shikano et al.

It is certified that error appears in the above-identified patent and that said Letters Patent is hereby corrected as shown below:

At column 31, line 41 in Claim 2, please delete “whrch” and insert - - which - -, therefor.

At column 32, line 40 in Claim 9, please delete “thereof,” and insert - - thereof - -, therefor.

Signed and Sealed this

Twenty-second Day of August, 2006

JON W. DUDAS
*Director of the United States Patent and Trademark Office*